(12) United States Patent
Rong et al.

(10) Patent No.: US 12,003,280 B2
(45) Date of Patent: Jun. 4, 2024

(54) ANALOG DOMAIN LOOPBACK MODES

(71) Applicant: Dell Products L.P., Round Rock, TX (US)

(72) Inventors: Danyi Rong, Ottawa (CA); John Bradley Deforge, Chelsea (CA); Tommy Ivarsson, Ottawa (CA); Sewvanda Don, Ottawa (CA)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 17/660,353

(22) Filed: Apr. 22, 2022

(65) Prior Publication Data

US 2023/0344530 A1 Oct. 26, 2023

(51) Int. Cl.
*H04B 17/14* (2015.01)
*H04B 17/19* (2015.01)
*H04B 17/29* (2015.01)

(52) U.S. Cl.
CPC ............ *H04B 17/14* (2015.01); *H04B 17/19* (2015.01); *H04B 17/29* (2015.01)

(58) Field of Classification Search
CPC ......... H04B 17/14; H04B 17/19; H04B 17/29
See application file for complete search history.

(56) References Cited

U.S. PATENT DOCUMENTS

| | | | |
|---|---|---|---|
| 5,311,190 A * | 5/1994 | Devendorf | G01S 7/032 342/103 |
| 8,565,343 B1 * | 10/2013 | Husted | H04B 1/0475 455/114.3 |
| 9,596,676 B2 | 3/2017 | Gotman | |
| 10,218,490 B1 | 2/2019 | Yang et al. | |
| 10,333,764 B1 * | 6/2019 | Arditti Ilitzky | H03C 3/403 |
| 11,012,201 B2 * | 5/2021 | Hormis | H04L 1/243 |
| 2004/0106380 A1 | 6/2004 | Vassiliou et al. | |
| 2012/0281772 A1 * | 11/2012 | Bailey | H04B 17/13 375/259 |
| 2013/0107914 A1 | 5/2013 | Park et al. | |
| 2014/0355714 A1 | 12/2014 | Cheng et al. | |

(Continued)

FOREIGN PATENT DOCUMENTS

| | | |
|---|---|---|
| EP | 2822189 | 1/2015 |
| EP | 3046260 | 7/2016 |
| EP | 3962008 | 3/2022 |

OTHER PUBLICATIONS

Deforge, et al. "Detection and Cancellation of Unwanted Signals in a Wirelesscommunication Radio Unit" U.S. Appl. No. 17/710,824, filed Mar. 31, 2022, 75 pages.

(Continued)

*Primary Examiner* — Junpeng Chen
(74) *Attorney, Agent, or Firm* — Amin, Turocy & Watson, LLP

(57) ABSTRACT

A system can comprise a radio unit comprising a transmitter, a receiver, and a power amplifier. The system can further comprise a hardware loopback that communicatively couples the transmitter and the receiver via an analog section of the radio unit, wherein the hardware loopback is selected at a component disposed between the transmitter and the power amplifier. The system can further comprise a hardware component that is configured to transmit a signal from the transmitter to the receiver via the hardware loopback.

20 Claims, 20 Drawing Sheets

(56) References Cited

U.S. PATENT DOCUMENTS

| | | | |
|---|---|---|---|
| 2015/0030102 A1* | 1/2015 | Hormis | H04L 27/366 |
| | | | 375/296 |
| 2015/0030103 A1* | 1/2015 | Hormis | H04L 1/243 |
| | | | 375/296 |
| 2018/0006795 A1 | 1/2018 | Raaf | |
| 2018/0054254 A1* | 2/2018 | Cederholm | H04B 3/46 |
| 2021/0116501 A1* | 4/2021 | Martineau | H03F 3/68 |
| 2022/0029774 A1 | 1/2022 | Yuan et al. | |

OTHER PUBLICATIONS

Deforge, et al. "Detection, Cancellation, and Evaluation of Signals in a Wireless Communication Radio Unit" U.S. Appl. No. 17/721,156, filed Apr. 14, 2022, 68 pages.
International Search Report and Written Opinion for PCT Application No. PCT/US2022/053275 mailed May 2, 2023, 18 pages.
Invitation to Pay Additional fees mailed Apr. 17, 2023 for PCT Application No. PCT/US2022/053064, 13 pages.
Invitation to Pay Additional fees mailed Apr. 17, 2023 for PCT Application No. PCT/US2022/053284, 12 pages.
International Search Report and Written Opinion for PCT Application No. PCT/US2022/053284 mailed Jun. 7, 2023, 17 pages.
International Search Report and Written Opinion for PCT Application No. PCT/US2022/053064 mailed Jul. 5, 2023, 20 pages.

\* cited by examiner

ANALOG DOMAIN LOOPBACK MODES

BACKGROUND

A radio can comprise a receiver and a transmitter that are used to receive and transmit, respectively, data.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can comprise a radio unit comprising a transmitter, a receiver, and a power amplifier. The system can further comprise a hardware loopback that communicatively couples the transmitter and the receiver via an analog section of the radio unit, wherein the hardware loopback is selected at a component disposed between the transmitter and the power amplifier. The system can further comprise a hardware component that is configured to transmit a signal from the transmitter to the receiver via the hardware loopback.

An example method can comprise selecting, by a system comprising a processor, to route an analog signal from a transmitter of a radio to a receiver of the radio via an analog loopback of the radio at a hardware component positioned between the transmitter and a power amplifier of the radio. The method can further comprise transmitting, by the system, the analog signal via the analog loopback. The method can further comprise capturing, by the system, the analog signal received at the receiver.

An example apparatus can comprise a loopback component that is configured to transmit an analog signal from a transmitter of a radio to a receiver of the radio via an analog loopback of the radio. The apparatus can further comprise a selector component that is configured to access the loopback component, wherein the selector component is positioned between the transmitter and a power amplifier of the radio. The apparatus can further comprise a capture component that is configured to capture the analog signal received at the receiver.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which.

DETAILED DESCRIPTION

Overview

Figure 1A:
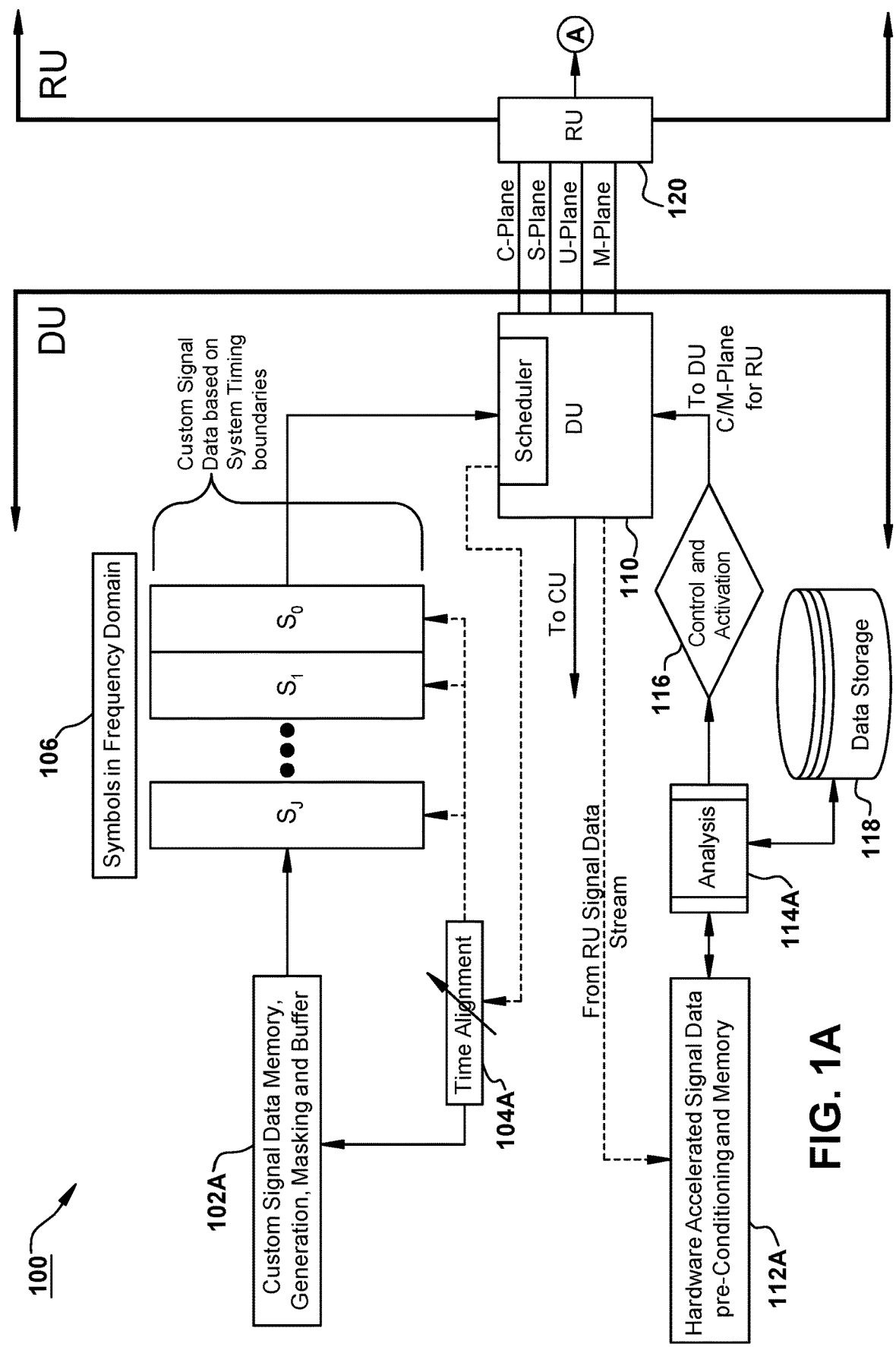
FIG. 1A, FIG. 1B, FIG. 1C, and FIG. 1D illustrate an example system architecture that can facilitate analog domain loopback modes, in accordance with an embodiment of this disclosure.
Figure 1B:
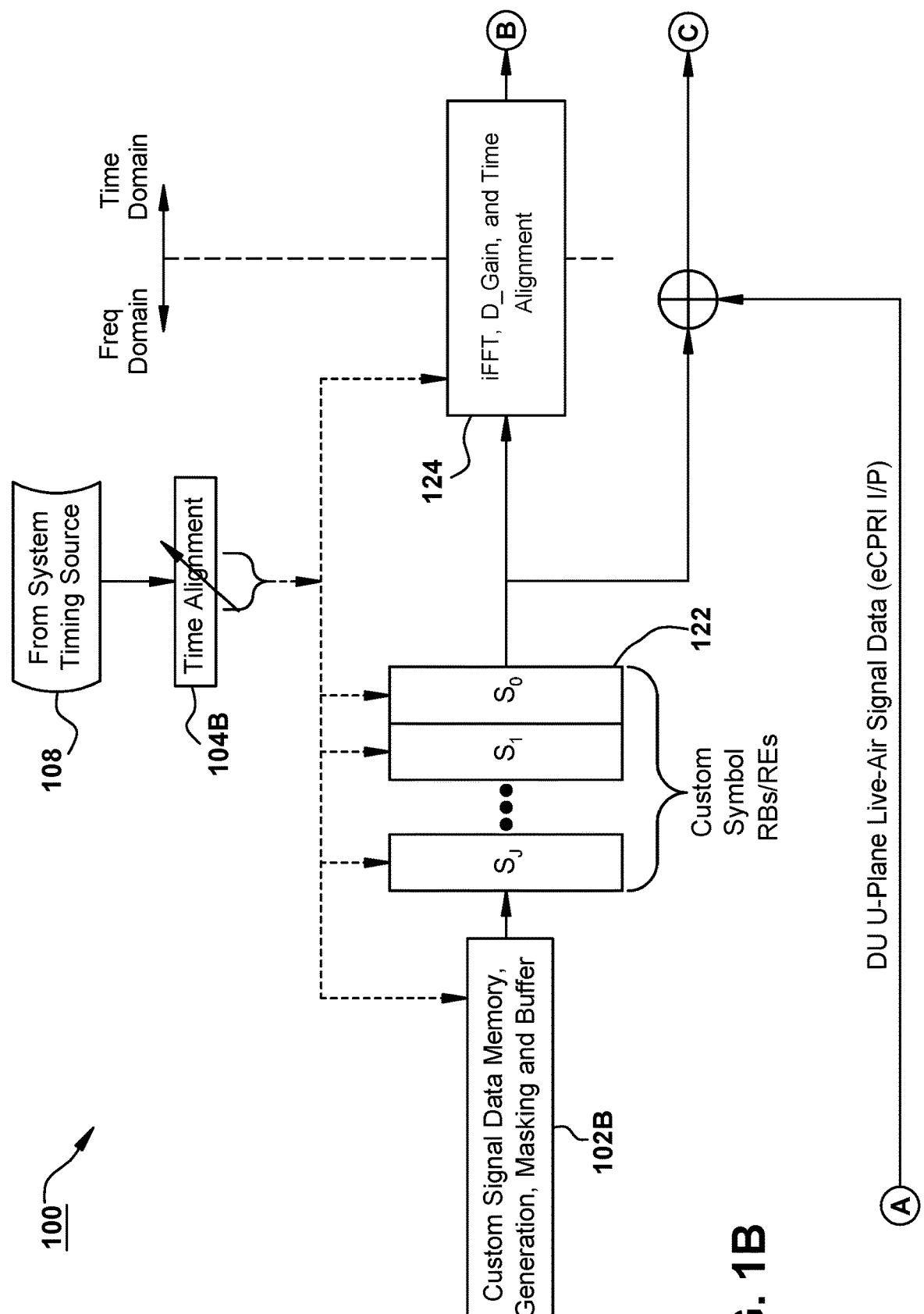
Figure 1C:
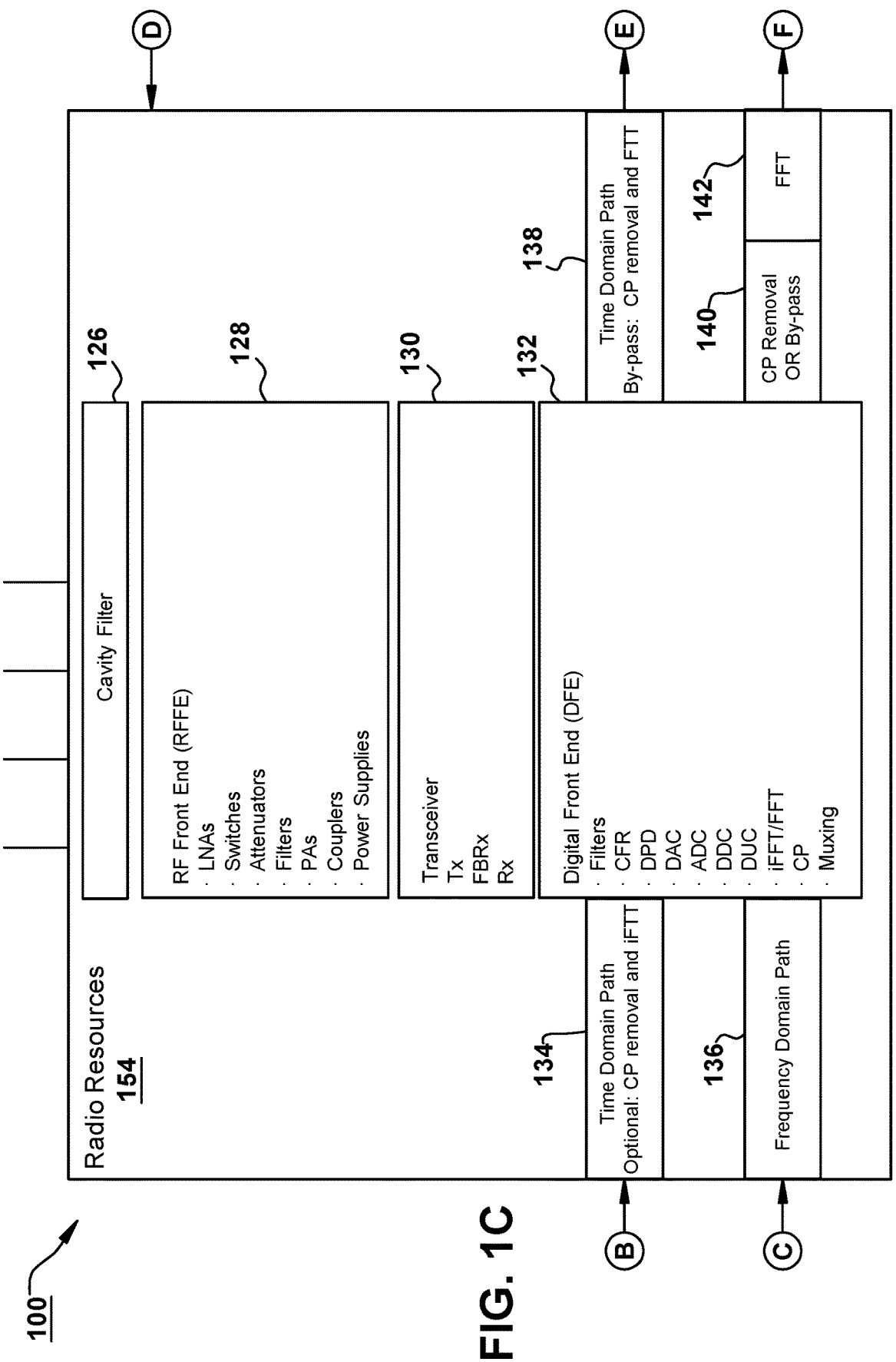
Figure 1D:
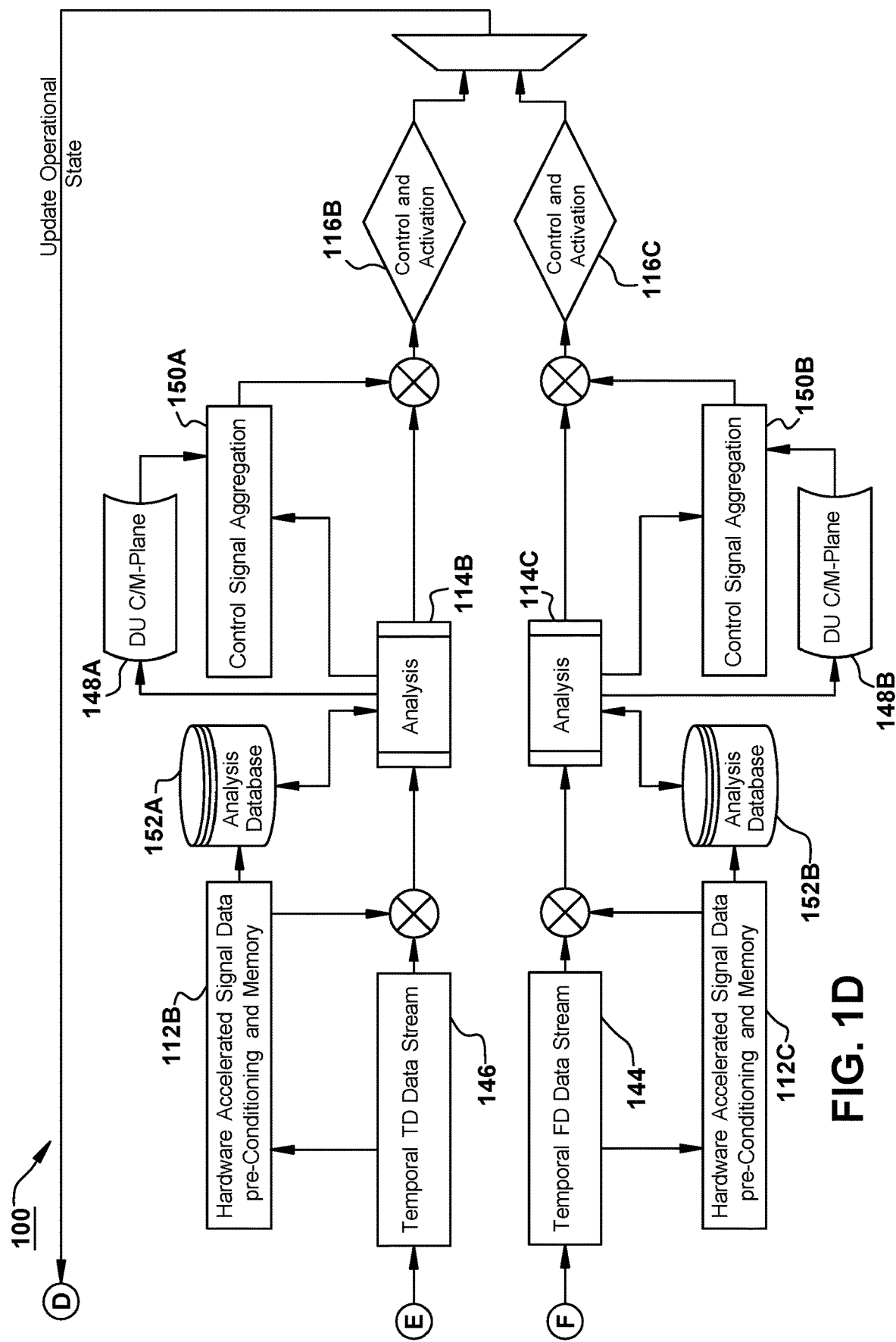

In modern wireless communications deployments, aspects and impacts of radio development engineering and system design tradeoffs can have far-reaching implications into customer capital expenditures, operating expenditures and overall completeness of a vendor's radio offerings. These engineering and systems design tradeoffs can result in what can be generally characterized as overall radio size, weight, thermal dissipation, reliability, complexity, and cost.

An ability to capture, analyze, and store frequency domain data and time domain data can facilitate an ability to perform system measurements in production or in deployed radio networks that can reduce a total cost of ownership (TCO) of a radio system; reduce a cost to produce a radio system; reduce capital expenditures related to a radio system; reduce operational expenditures related to a radio system; facilitate monitoring a field population of radios; provide actionable information for installation, commissioning, and automation of a network; facilitate a machine to machine (M2M) learning; facilitate a digital twins (which can comprise a computer model of a radio system that is used to evaluate the physical radio system); etc.

An ability to evaluate, or re-evaluate, post-production, a radio's digital and analog signal paths, combined with an ability to analyze, store, and contrast radio performance metrics in an autonomous fashion can be utilized to lower cost and improve manageability of a population of deployed radios.

The present techniques can be implemented to provide a topology in a radio system that facilitates a loopback of signal data in an analog domain. A transmitter of a radio system can function as a signal generator for analog components of the radio system. A receiver of the radio system can function as a signal analyzer, or spectrum analyzer, to capture signals that have passed through the analog components. The present techniques can be implemented to link a transmitter (Tx) and a receiver (Rx), providing an analog loopback path through an analog section of a radio system. This loopback can provide an approach to facilitate a complete signal path through circuits in an analog portion of a radio system.

The present techniques can be implemented to provide coverage for all antenna branches of a radio system. A loopback signal can be injected, captured, analyzed, and/or used to engage radio unit actuator control features.

In an example, signal data can be injected into a radio's signal chain for a purpose of deriving radio performance data. Frequency domain or time domain data for signals can be captured at multiple different digital front end blocks in a system chain. At least some of these signals can have origins in custom signals that are injected into signal chains. Signals that are captured, analyzed, and stored can be used to derive performance parameters and can be formed into useful fields for storage in a radio-local database.

Historical performance data can be recalled and compared and/or contrasted together, or with current data. Data that is compared and/or contrasted can be further analyzed to derive other information about the radio, such as health information, aging information, soft-fail information, no fault found (NFF) information, and/or diagnostic data.

Data from a field of deployed radios can be returned to a radio vendor or radio customer for further analysis, and be managed alongside a digital twin, machine learning/artificial intelligence (MI/AL), or other purposes. Field data can be further used to perform post-production fine tuning of radio performance parameters through radio production software updates made available as beneficial software platform updates.

The present techniques can be implemented to utilize analog signal path multiplexing. In an example, down link signal data can be multiplexed into an up link path via an analog signal tap and injection point. In another example, an antenna calibration port signal can be used with analog signal path multiplexing for down link and/or up link antenna calibration. In another example, analog signal path multiplexing can be used for a voltage standing wave ratio (VSWR) loopback path.

In some examples, calibration and test can be controlled, and stimulation can originate, from the radio unit only, from the distributed unit only, or from a hybrid combination of radio unit and distributed unit interactions. In some examples, capture and termination of signals, analysis, and data can occur on the radio unit, the distributed unit, or a hybrid or the radio unit and the distributed unit for analysis and/or storage. A central unit of a radio system and/or a centralized database can be used for termination of this analysis and data.

That is, the present techniques can be implemented for a radio topology that facilitates an analog loopback for a receiver, for antenna calibration, and/or for VSWR. Custom signal generation and insertion can occur at the radio unit, and custom signal capture can also occur at the radio unit. A distributed unit can also be incorporated into the present techniques, where custom signal generation and insertion can occur at the distributed unit (and/or a hybrid of the distributed unit and the radio unit for custom signal generation), and custom signal capture can also occur at the distributed unit. A central unit can also be incorporated into the present techniques, for custom signal generation and/or capture.

According to the present techniques, circuitry to transport a signal via an analog loopback can be designed such that the signal can arrive at a source point such that it meets a signal-to-noise performance metric. The present techniques can be implemented provide full coverage of circuitry that is not covered by prior techniques (such as observation and FBRx receivers), and can be implemented to provide full coverage of all radio analog circuitry (and, by extension, digital circuitry).

Analog circuitry can have latency as a signal passes from block to block. For ease of comparison and hardware acceleration in a determination of radio performance, time alignment can be implemented to facilitate a precise alignment of a source signal and a signal that is captured. In some examples, the signal is not captured at an input, but can be a memory representation of the input signal.

In some examples, implementing the present techniques can create a cost savings in production, where an engineering team might otherwise conclude that the present techniques provide for too costly of a circuit or functionality to add to a production-level product.

Through use of an analog loopback topology, prior factory test instruments and test beds can generally be eliminated. This can result in a manufacturing savings that exceed the cost of implementation. Additionally, the present techniques can facilitate more repeatable results, as well as a test/self-test functionality that travels with the radio to the field.

In some examples, testing analog circuitry and a digital block to which they interface can require a predictable, fixed, or somewhat known environment to yield repeatable and deterministic results. A radio with wholly internal analog and digital paths—internal to the radio without a need for external instruments, fixtures, or modification thereof—can produce repeatable results.

In some prior approaches to radio testing in a factory testing environment, the radio and the instruments and apparatus interfaced to perform the tests can be two different domains. That is, there can be a device under test (DUT), a radio, and a test bed/test set, or test platform that interacts with the device under test.

At the point of interaction in such radio testing, there can be many variables: radio to test set (physical) interconnect, very high speed radio frequency (RF) and digital cables and interfaces, direct current (DC)/alternating current (AC) interface (I/F), digital and analog control interfaces, RF, power, and control line switching, a bed of nails can be deployed, there can be active and passive components inline between the DUT and the test set, the test set can be ensured to be calibrated, and that calibration can be concluded to be good. The calibration's purpose can be to remove unknowns in this complex orchestration between the DUT and the test set before a test is executed. In some examples, it can be that, without calibration, relatively little of data that is collected will be valid.

If the variables and unknowns are eliminated, the DUT remains, and pathways within the DUT that are invariant. That is, it can be that any calibration that is desired can be performed at any time in the production or lifecycle of the DUT since that signal source and that signal capture pathway can be invariant throughout the lifetime of the DUT. Calibration can be performed at any time—it can be that the relative data that can be collected on the radio will not change over time providing that a fault condition has not developed—and if a fault condition does develop, then the relative comparative tests can show a performance change. Relative tests can also show results of aging through the radio's lifetime.

It can be a challenge to build a radio that meets all specifications and requirements of a target employment, and is able to self-test. The present techniques can be implemented to facilitate a DUT that is its own test set and is capable of performing typical test sets internally, without impacting radio performance requirements.

It can be that digital circuitry is deterministic, where an output equals an input and a transfer function. RF or analog circuitry can change with environmental conditions, however, if a stimulus is unchanging, and a capture technique is unchanging, then the only variable can be the circuit under test. Environmental changes can be predictable and/or characterizable for a given circuit, so they can be predictable to a reasonable degree. And for a given input, and re-using a same capture approach, a functional circuit can be deterministic to a reasonable degree given normal operating conditions and operating state.

Deviations from normal operation can then relate to knowable or determinable mechanisms: software (SW), firmware (FW), hardware (HW), operational-state error, or a change in operations due to an external influence such as a failure or fault in the operational circuit. Knowable or determinable causality can be derived from tests evaluated by and from the perspective of a design engineer or artificial intelligence (AI)/machine learning (ML) agent, where a fault or failure can be characterizable and knowable where a sufficient suite of tests is performed and corresponding results are analyzed.

A digital twin can then be used to assess real time and historical data over a lifespan of the population of radios in the field. Refinement of characterization can become more deterministic with time.

For these reasons, a complexity of adding an analog loopback self-test can unlock a repeatable, reproducible, and field-testable radio that is capable of producing laboratory-level complexity test results, repeatable throughout a lifetime of a fielded radio unit, which are deterministic, and by association, a suite of tests, commands, and/or stimuli can also be refined to become deterministic.

Example Architectures

FIG. 1A, FIG. 1B, FIG. 1C, and FIG. 1D illustrate an example system architecture 100 that can facilitate analog domain loopback modes, in accordance with an embodiment of this disclosure.

As depicted, system architecture 100 comprises custom signal data memory, generation, masking, and buffer 102A and custom signal data memory, generation, masking, and buffer 102B; time alignment 104A and time alignment 104B; custom symbol RBs/REs 106; from timing system source 108; distributed unit 110; hardware accelerated signal data, pre-conditioning and memory 112A, hardware accelerated signal data, pre-conditioning and memory 112B, and hardware accelerated signal data, pre-conditioning and memory 112C; analysis 114A, analysis 114B, and analysis 114C; control and activation 116A, control and activation 116B, and control and activation 116C; data storage 118; RU 120; custom symbol RBs/REs 122; inverse Fast Fourier Transform (iFFT) 124 (which can also perform A gain, cyclic prefix insertion, and time alignment); cavity filter 126; radiofrequency (RF) front end (RFFE) 128 (which can include low noise amplifiers (LNAs), switches, attenuators, filters, PAs, couplers, and power supplies); transceiver 130 (which can include Tx, FBRx, and Rx); digital front end 132 (which can include filters, CFR, DPD, a digital to analog converter (DACs), an analog to digital converter (ADC), a digital down converters (DDC), a digital up converter (DUC), and iFFT/FFT, CP, and multiplexing); time domain path 134 (which can bypass CP injection and iFFT); frequency domain path 136; time domain path 138 (which can bypass CP removal and FFT); CP removal or bypass 140; FFT 142; temporal frequency domain (FD) data stream 144; temporal time domain (TD) data stream 146; DU C/M-plane 148A and DU C/M-plane 148B; control system aggregation 150A and control system aggregation 150B; analysis database 152A and analysis database 152B; and radio resources 154.

In system architecture 100, an analog loopback can be implemented between a transmitter and a receiver of transceiver 130 (with a signal traveling through determined paths within RFFE 128). This analog loopback can be used to perform various radio system functions, such as calibration or self-test. For instance, a loopback can be implemented between transmission (Tx) blocks and receiver (Rx) blocks of transceiver 130 (while passing through switches, amplifiers, attenuators, filters, and couplers of RFFE 128). In other examples, a loopback can be implemented between transmission (Tx) blocks, antenna calibration (AntCal) and built-in self-test (BIST) calibration port, and feedback receiver (FBRx) blocks.

Figure 2:
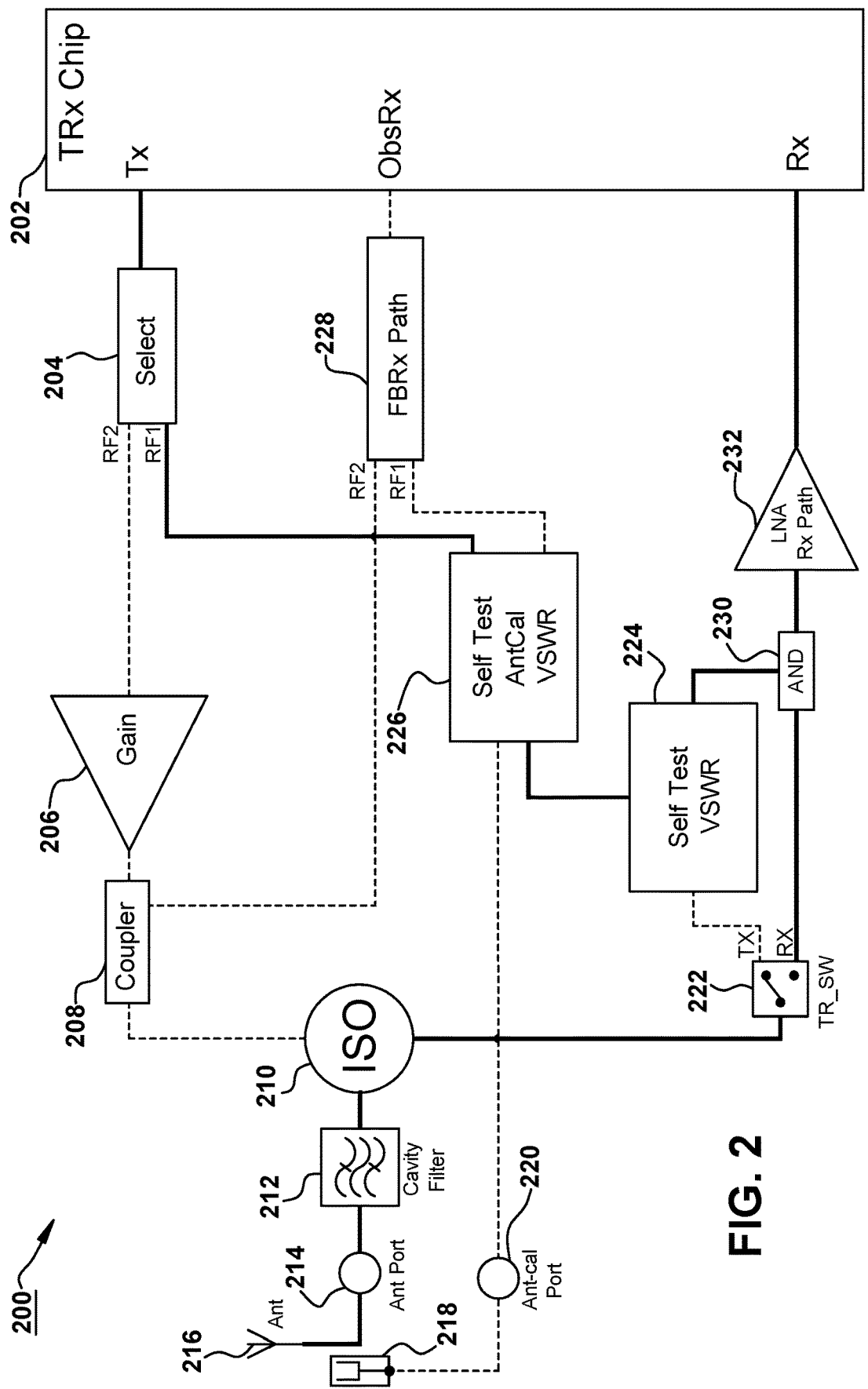
FIG. 2 illustrates an example system architecture of a loopback that can facilitate analog domain loopback modes, in accordance with an embodiment of this disclosure.

FIG. 2 illustrates an example system architecture 200 of a loopback that can facilitate analog domain loopback modes, in accordance with an embodiment of this disclosure. In some examples, system architecture can comprise a loopback that can pass through a RFFE, such as RFFE 128 of FIGS. 1A, 1B, 1C, and 1D.

In system architecture 200, the bolded portions generally depict an example analog loopback. Part(s) of system architecture 200 can be used to implement a loopback in system architecture 100 of FIGS. 1A, 1B, 1C, and 1D.

System architecture 200 comprises transceiver (TRx) chip 202; select 204 (which can select between multiple signal paths, such as sending a signal to gain 206 or to self-test/AntCal/VSWR 226); gain 206; coupler 208; isolator/circulator 210; cavity filter 212; antenna port 214; antenna 216; antenna coupler 218; antenna calibration (ant-cal, or AntCal) port 220; switch 222; self-test/VSWR 224; self-test/AntCal/VSWR 226; feedback receiver (FBRx) path 228; AND 230; and low noise amplifier receiver (LNA Rx) path 232.

A loopback path in system architecture 200 can comprise transceiver chip 202; select 204; self-test/AntCal/VSWR 226; self-test/VSWR 224; AND 230; and LNA Rx path 232. This loopback path can generally start at a transmitter of transceiver chip 202, and end at a receiver of transceiver chip 202. By connecting the transmitter and the receiver, a signal that is sent out on the transmitter can be looped back and received at the receiver.

Figure 3:
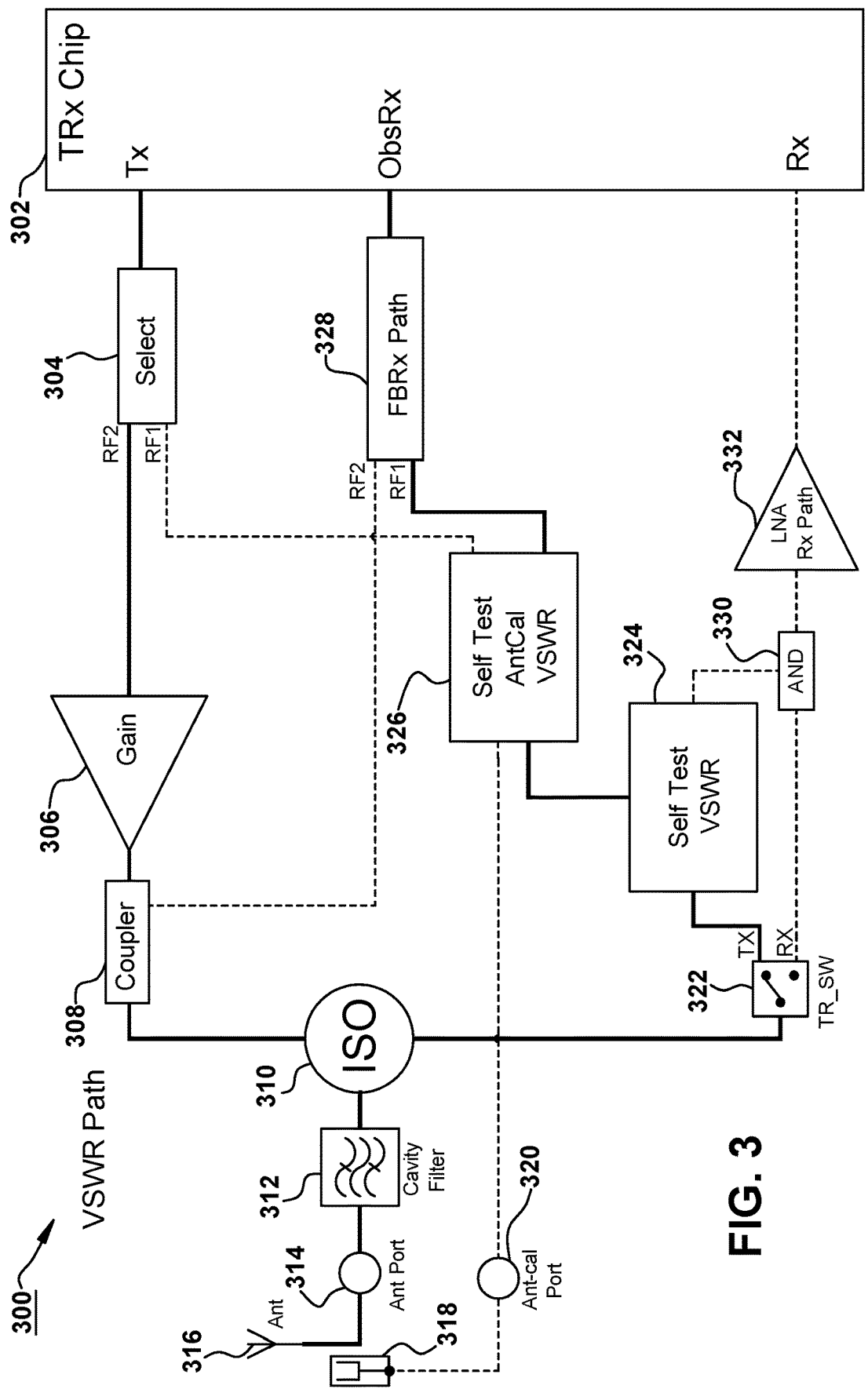
FIG. 3 illustrates an example system architecture of a loopback for a voltage standing wave ratio (VSWR) that can facilitate analog domain loopback modes, in accordance with an embodiment of this disclosure.

FIG. 3 illustrates an example system architecture 300 of a loopback for a voltage standing wave ratio (VSWR) that can facilitate analog domain loopback modes, in accordance with an embodiment of this disclosure.

In system architecture 300, the bolded portions generally depict an example analog loopback. Part(s) of system architecture 300 can be used to implement a loopback in system architecture 100 of FIGS. 1A, 1B, 1C, and 1D.

System architecture 300 comprises transceiver (TRx) chip 302; select 304 (which can select between multiple signal paths, such as sending a signal to gain 306 or to self-test/AntCal/VSWR 326); gain 306; coupler 308; isolator/circulator 310; cavity filter 312; antenna port 314; antenna 316; antenna coupler 318; antenna calibration port 320; switch 322; self-test/VSFW 324; self-test/AntCal/VSWR 326; feedback receiver (FBRx) path 328; AND 330; and low noise amplifier receiver (LNA Rx) path 332.

A loopback path in system architecture 300 can comprise transceiver chip 302; select 304; gain 306; coupler 308; isolator/circulator 310; switch 322; self-test/VSFW 324; self-test/AntCal/VSWR 326; and feedback receiver (FBRx) path 328. This loopback path can generally start at a transmitter of transceiver chip 302, and end at a receiver of transceiver chip 302. By connecting the transmitter and the receiver, a signal that is sent out on the transmitter can be looped back and received at the receiver.

Figure 4:
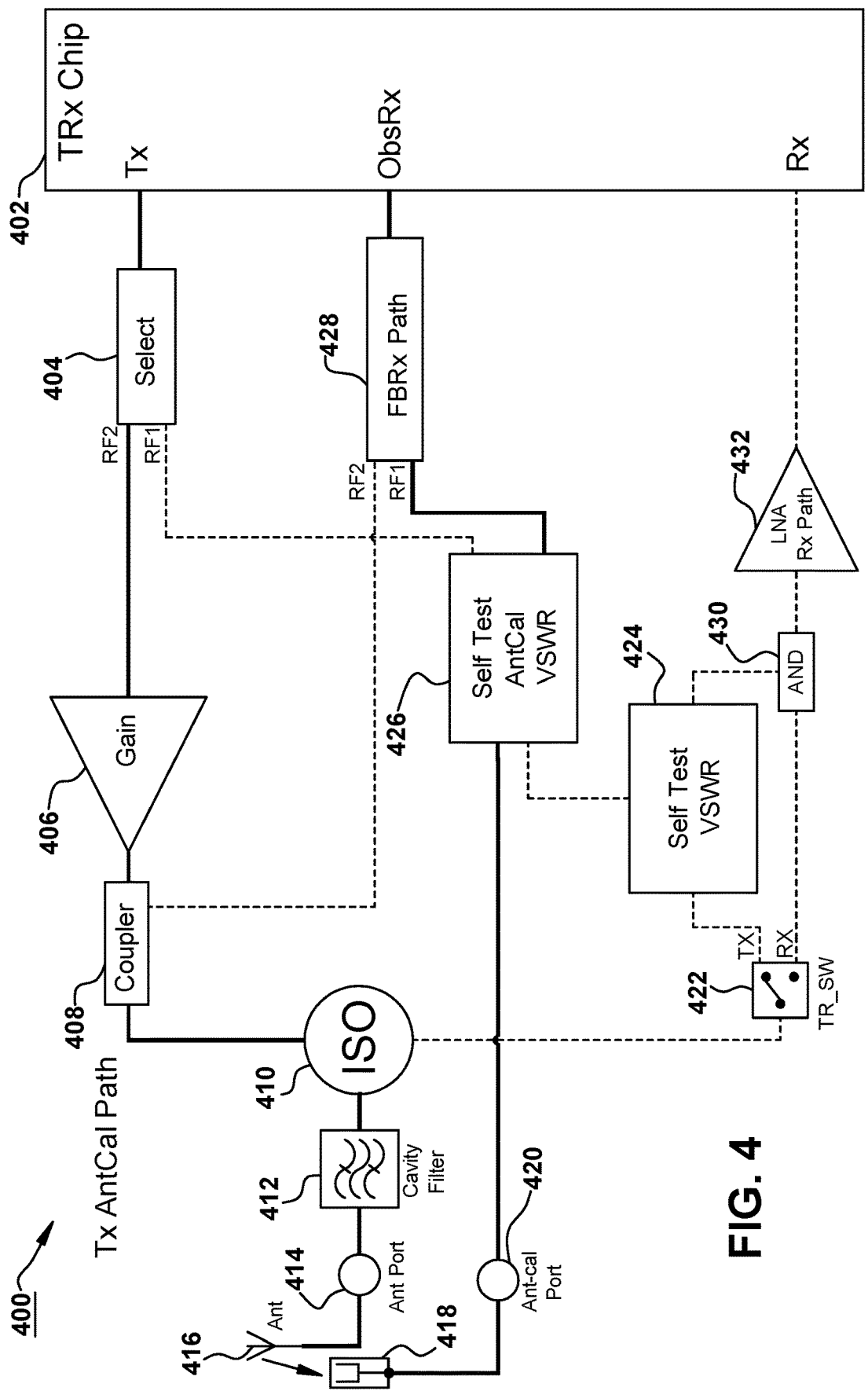
FIG. 4 illustrates an example system architecture of a loopback for a transmitter antenna calibration (Tx AntCal) path that can facilitate analog domain loopback modes, in accordance with an embodiment of this disclosure.

FIG. 4 illustrates an example system architecture 400 of a loopback for a transmitter antenna calibration (Tx AntCal) path that can facilitate analog domain loopback modes, in accordance with an embodiment of this disclosure.

In system architecture 400, the bolded portions generally depict an example analog loopback. Part(s) of system architecture 400 can be used to implement a loopback in system architecture 100 of FIGS. 1A, 1B, 1C, and 1D.

System architecture 400 comprises transceiver (TRx) chip 402; select 404 (which can select between multiple signal paths, such as sending a signal to gain 406 or to self-test/AntCal/VSWR 426); gain 406; coupler 408; isolator/circulator 410; cavity filter 412; antenna port 414; antenna 416; antenna coupler 418; antenna calibration port 420; switch 422; self-test/VSFW 424; self-test/AntCal/VSWR 426; feedback receiver (FBRx) path 428; AND 430; and low noise amplifier receiver (LNA Rx) path 432.

A loopback path in system architecture 400 can comprise transceiver chip 402; select 404; gain 406; coupler 408; isolator/circulator 410; cavity filter 412; antenna port 414; antenna 416; antenna coupler 418; antenna calibration port 420; self-test/AntCal/VSWR 426; and feedback receiver (FBRx) path 428. This loopback path can generally start at a transmitter of transceiver chip 402, and end at a receiver of transceiver chip 402. By connecting the transmitter and the receiver, a signal that is sent out on the transmitter can be looped back and received at the receiver.

Figure 5:
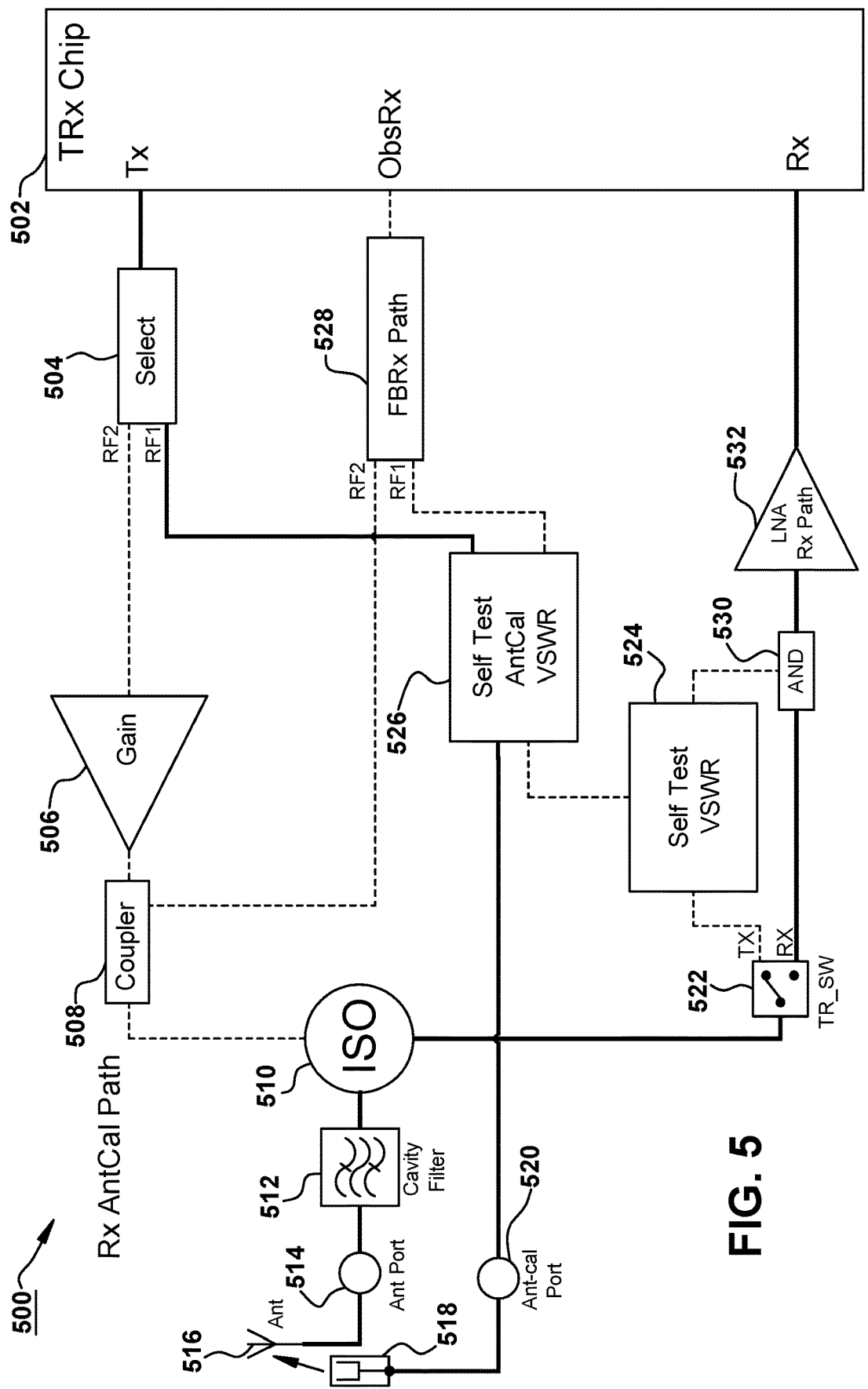
FIG. 5 illustrates an example system architecture of a loopback for a receiver antenna calibration (Rx AntCal) path that can facilitate analog domain loopback modes, in accordance with an embodiment of this disclosure.

FIG. 5 illustrates an example system architecture 500 of a loopback for a receiver antenna calibration (Rx AntCal) path that can facilitate analog domain loopback modes, in accordance with an embodiment of this disclosure.

In system architecture 500, the bolded portions generally depict an example analog loopback. Part(s) of system architecture 500 can be used to implement a loopback in system architecture 100 of FIGS. 1A, 1B, 1C, and 1D.

System architecture 500 comprises transceiver (TRx) chip 502; select 504 (which can select between multiple signal paths, such as sending a signal to gain 506 or to self-test/AntCal/VSWR 526); gain 506; coupler 508; isolator/circulator 510; cavity filter 512; antenna port 514; antenna 516; antenna coupler 518; antenna calibration port 520; switch 522; self-test/VSFW 524; self-test/AntCal/VSWR 526; feedback receiver (FBRx) path 528; AND 530; and low noise amplifier receiver (LNA Rx) path 532.

A loopback path in system architecture 500 can comprise transceiver chip 502; select 504; self-test/AntCal/VSWR 526; antenna calibration port 520; antenna coupler 518; antenna 516; antenna port 514; cavity filter 512; isolator/circulator 510; switch 522; AND 530; and low noise amplifier receiver (LNA Rx) path 532. This loopback path can generally start at a transmitter of transceiver chip 502, and end at a receiver of transceiver chip 502. By connecting the transmitter and the receiver, a signal that is sent out on the transmitter can be looped back and received at the receiver.

Figure 6:
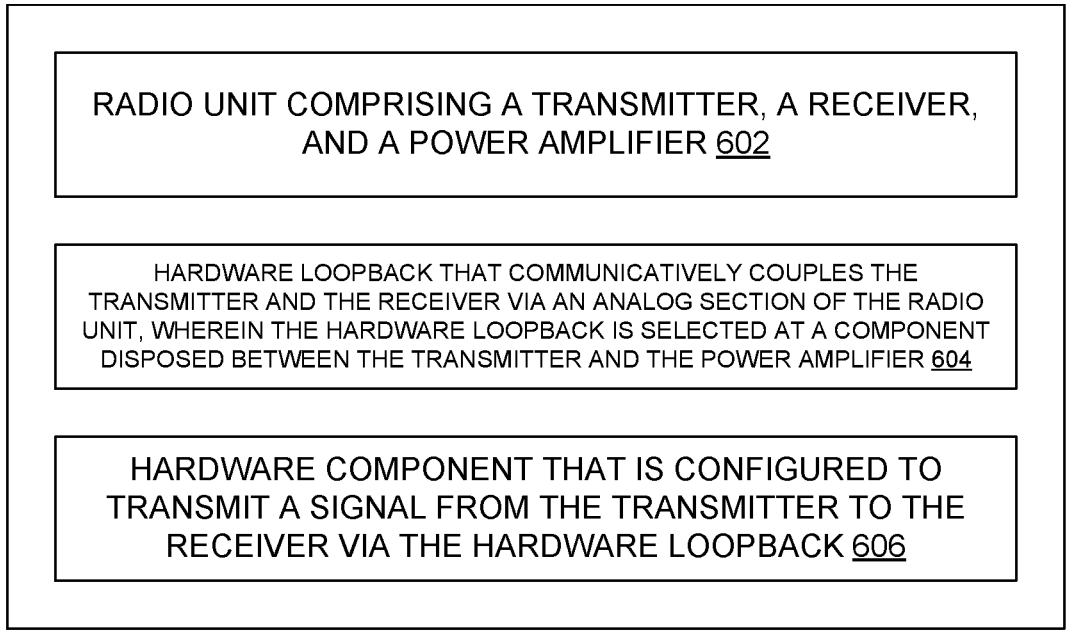
FIG. 6 illustrates another example system architecture that can facilitate analog domain loopback modes, in accordance with an embodiment of this disclosure.

FIG. 6 illustrates another example system architecture 600 that can facilitate analog domain loopback modes, in accordance with an embodiment of this disclosure. In some examples, part(s) of system architecture 600 can be used to implement system architecture 100 of FIGS. 1A, 1B, 1C, and 1D.

System architecture 600 comprises radio unit comprising a transmitter, a receiver, and a power amplifier 602; hardware loopback that communicatively couples the transmitter and the receiver via an analog section of the radio unit, wherein the hardware loopback is selected at a component disposed between the transmitter and the power amplifier 604; and hardware component that is configured to transmit a signal from the transmitter to the receiver via the hardware loopback 606.

Radio unit comprising a transmitter, a receiver, and a power amplifier 602 can be similar to a radio unit of FIGS. 1A, 1B, 1C, and 1D, including radio resources 154. Hardware loopback that communicatively couples the transmitter and the receiver via an analog section of the radio unit, wherein the hardware loopback is selected at a component disposed between the transmitter and the power amplifier 604 can be similar to the loopback of one or more of FIGS. 2-5. The component disposed between the transmitter and the power amplifier can be similar to select 204 of FIG. 2, select 304 of FIG. 3, select 404 of FIG. 4, and/or select 504 of FIG. 5. Hardware component that is configured to transmit a signal from the transmitter to the receiver via the hardware loopback 606 can be similar to TRx chip 202 of FIG. 2, TRx chip 302 of FIG. 3, TRx chip 402 of FIG. 4, and/or TRx chip 502 of FIG. 5.

Figure 7:
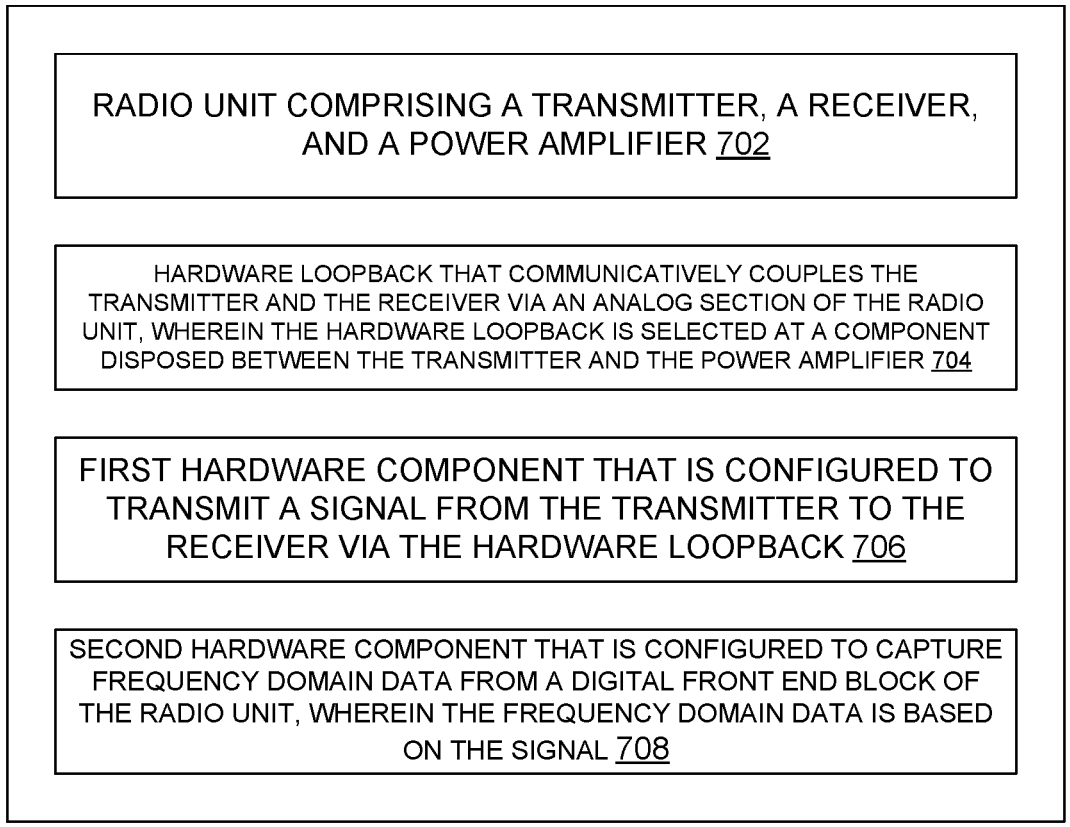
FIG. 7 illustrates another example system architecture that can facilitate analog domain loopback modes, in accordance with an embodiment of this disclosure.

FIG. 7 illustrates another example system architecture 700 that can facilitate analog domain loopback modes, in accordance with an embodiment of this disclosure. In some examples, part(s) of system architecture 700 can be used to implement system architecture 100 of FIGS. 1A, 1B, 1C, and 1D.

System architecture 700 comprises radio unit comprising a transmitter, a receiver, and a power amplifier 702 (which can be similar to radio unit comprising a transmitter, a receiver, and a power amplifier 602 of FIG. 6 radio unit comprising a transmitter, a receiver, and a power amplifier 602); hardware loopback that communicatively couples the transmitter and the receiver via an analog section of the radio unit, wherein the hardware loopback is selected at a component disposed between the transmitter and the power amplifier 704 (which can be similar to hardware loopback that communicatively couples the transmitter and the receiver via an analog section of the radio unit, wherein the hardware loopback is selected at a component disposed between the transmitter and the power amplifier 604); hardware component that is configured to transmit a signal from the transmitter to the receiver via the hardware loopback 706 (which can be similar to hardware component that is configured to transmit a signal from the transmitter to the receiver via the hardware loopback 606); and second hardware component that is configured to capture frequency domain data from a digital front end block of the radio unit, wherein the frequency domain data is based on the signal 708.

Second hardware component that is configured to capture frequency domain data from a digital front end block of the radio unit, wherein the frequency domain data is based on the signal 708 can capture signals from certain digital front end blocks in a system chain, and capture these signals in a frequency domain.

Figure 8:
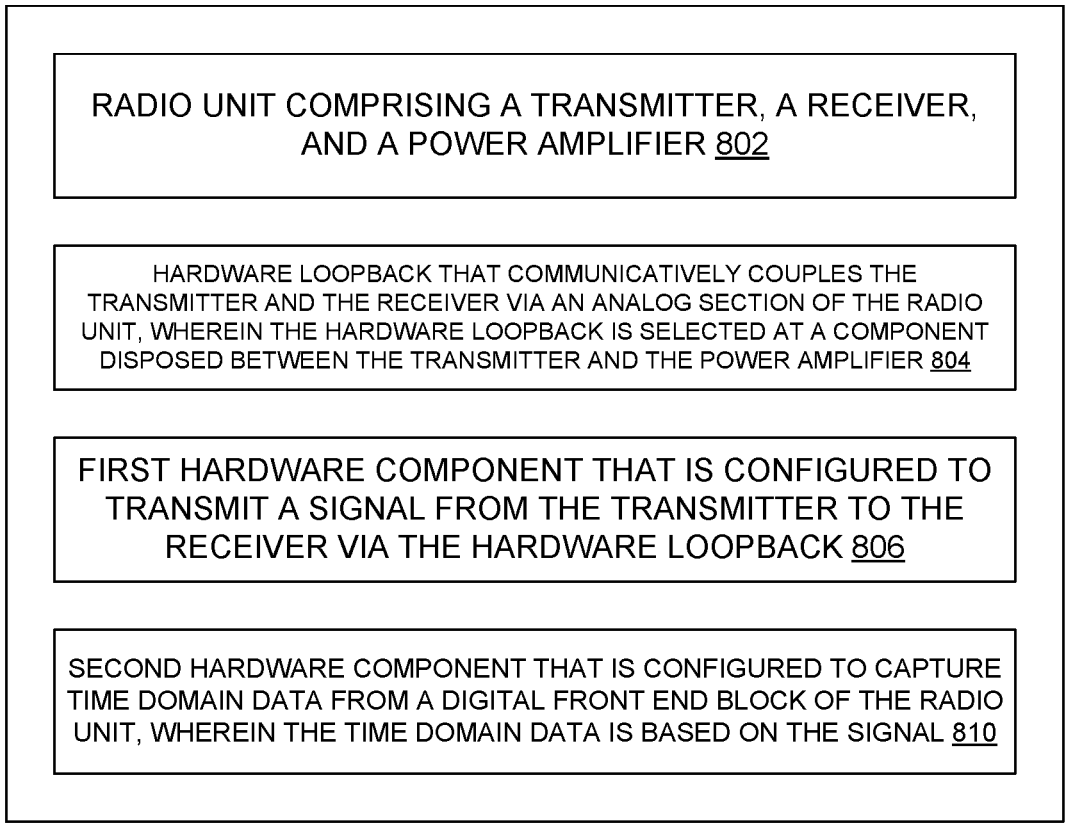
FIG. 8 illustrates another example system architecture that can facilitate analog domain loopback modes, in accordance with an embodiment of this disclosure.

FIG. 8 illustrates another example system architecture 800 that can facilitate analog domain loopback modes, in accordance with an embodiment of this disclosure. In some examples, part(s) of system architecture 800 can be used to implement system architecture 100 of FIGS. 1A, 1B, 1C, and 1D.

System architecture 800 comprises radio unit comprising a transmitter, a receiver, and a power amplifier 802 (which can be similar to radio unit comprising a transmitter, a receiver, and a power amplifier 602 of FIG. 6 radio unit comprising a transmitter, a receiver, and a power amplifier 602); hardware loopback that communicatively couples the transmitter and the receiver via an analog section of the radio unit, wherein the hardware loopback is selected at a component disposed between the transmitter and the power amplifier 804 (which can be similar to hardware loopback that communicatively couples the transmitter and the receiver via an analog section of the radio unit, wherein the hardware loopback is selected at a component disposed between the transmitter and the power amplifier 604); hardware component that is configured to transmit a signal from the transmitter to the receiver via the hardware loopback 806 (which can be similar to hardware component that is configured to transmit a signal from the transmitter to the receiver via the hardware loopback 606); and second hardware component that is configured to capture time domain data from a digital front end block of the radio unit, wherein the time domain data is based on the signal 810.

Second hardware component that is configured to capture time domain data from a digital front end block of the radio unit, wherein the time domain data is based on the signal 810 can capture signals from certain digital front end blocks in a system chain, and capture these signals in a time domain.

Figure 9:
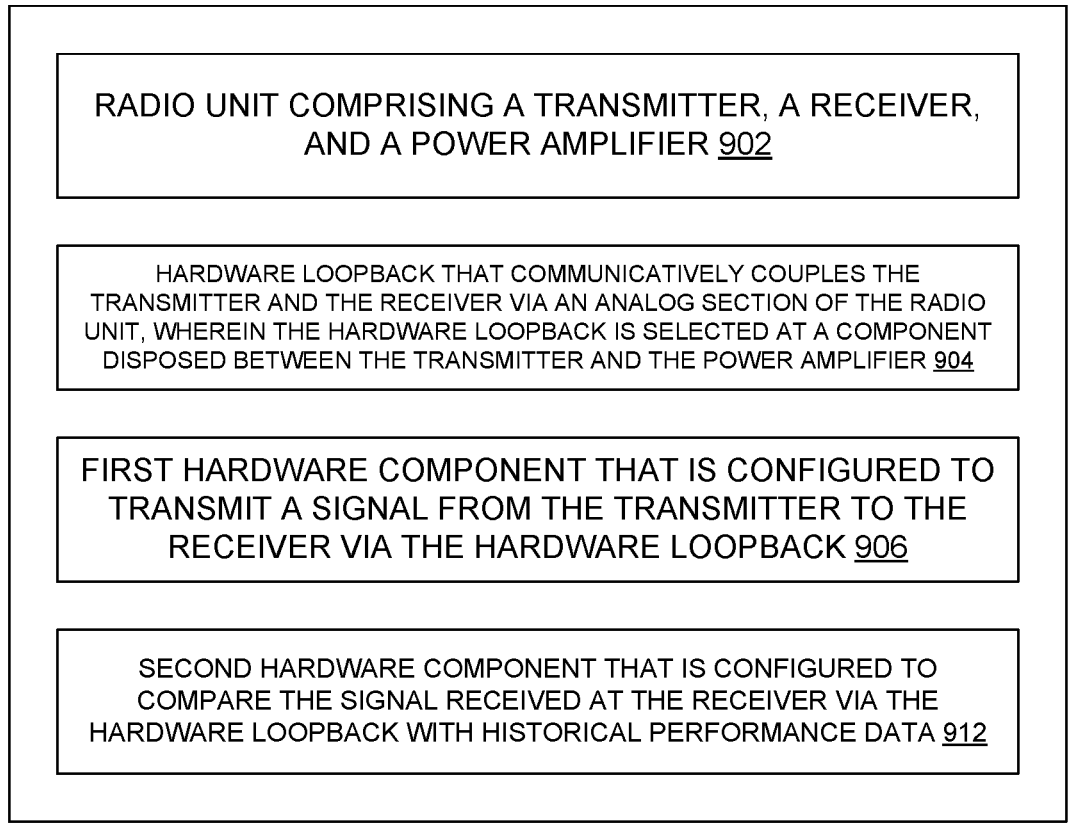
FIG. 9 illustrates another example system architecture that can facilitate analog domain loopback modes, in accordance with an embodiment of this disclosure.

FIG. 9 illustrates another example system architecture 900 that can facilitate analog domain loopback modes, in accordance with an embodiment of this disclosure. In some examples, part(s) of system architecture 900 can be used to implement system architecture 100 of FIGS. 1A, 1B, 1C, and 1D.

System architecture 900 comprises radio unit comprising a transmitter, a receiver, and a power amplifier 902 (which can be similar to radio unit comprising a transmitter, a receiver, and a power amplifier 602 of FIG. 6 radio unit comprising a transmitter, a receiver, and a power amplifier 602); hardware loopback that communicatively couples the transmitter and the receiver via an analog section of the radio unit, wherein the hardware loopback is selected at a component disposed between the transmitter and the power amplifier 904 (which can be similar to hardware loopback that communicatively couples the transmitter and the receiver via an analog section of the radio unit, wherein the hardware loopback is selected at a component disposed between the transmitter and the power amplifier 604); hardware component that is configured to transmit a signal from the transmitter to the receiver via the hardware loopback 906 (which can be similar to hardware component that is configured to transmit a signal from the transmitter to the receiver via the hardware loopback 606); and second hardware component that is configured to compare the signal received at the receiver via the hardware loopback with historical performance data 912.

In some examples second hardware component that is configured to compare the signal received at the receiver via the hardware loopback with historical performance data 912 can compare the signal with the historical performance data to produce compared data, and analyze the compared data to determine a health of the radio unit, an aging of the radio unit, a soft fail of the radio unit, a no fault found of the radio unit, or a diagnostic data of the radio unit.

Figure 10:
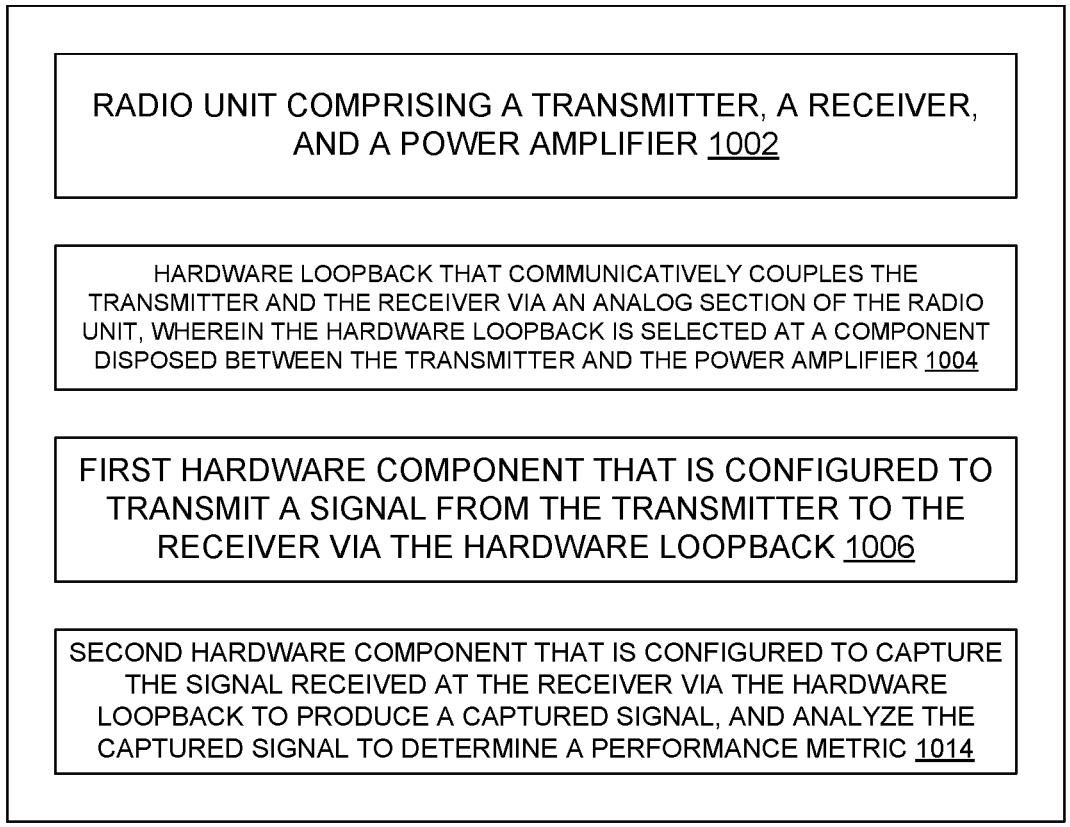
FIG. 10 illustrates another example system architecture that can facilitate analog domain loopback modes, in accordance with an embodiment of this disclosure.

FIG. 10 illustrates another example system architecture 1000 that can facilitate analog domain loopback modes, in accordance with an embodiment of this disclosure. In some examples, part(s) of system architecture 1000 can be used to implement system architecture 100 of FIGS. 1A, 1B, 1C, and 1D.

System architecture 1000 comprises radio unit comprising a transmitter, a receiver, and a power amplifier 1002 (which can be similar to radio unit comprising a transmitter, a receiver, and a power amplifier 602 of FIG. 6 radio unit comprising a transmitter, a receiver, and a power amplifier 602); hardware loopback that communicatively couples the transmitter and the receiver via an analog section of the radio unit, wherein the hardware loopback is selected at a component disposed between the transmitter and the power amplifier 1004 (which can be similar to hardware loopback that communicatively couples the transmitter and the receiver via an analog section of the radio unit, wherein the hardware loopback is selected at a component disposed between the transmitter and the power amplifier 604); hardware component that is configured to transmit a signal from the transmitter to the receiver via the hardware loopback 1006 (which can be similar to hardware component that is configured to transmit a signal from the transmitter to the receiver via the hardware loopback 606); and second hardware component that is configured to capture the signal received at the receiver via the hardware loopback to produce a captured signal, and analyze the captured signal to determine a performance metric 1014.

Second hardware component that is configured to capture the signal received at the receiver via the hardware loopback to produce a captured signal, and analyze the captured signal to determine a performance metric 1014 can use this performance metric to, for example, change an operational parameter of the radio based on the performance metric.

Figure 11:
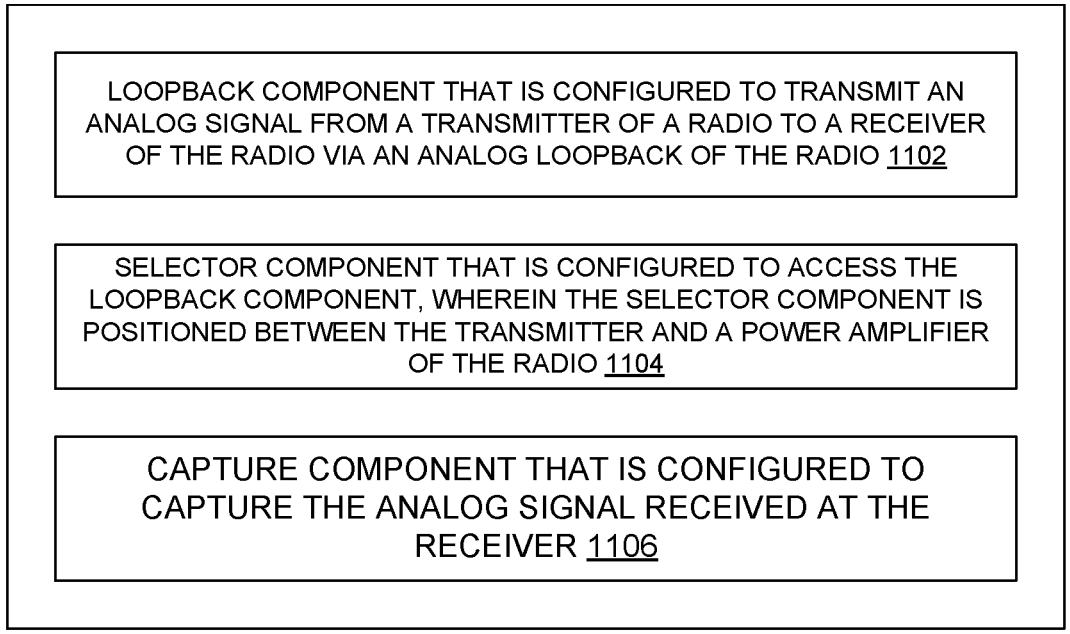
FIG. 11 illustrates another example system architecture that can facilitate analog domain loopback modes, in accordance with an embodiment of this disclosure.

FIG. 11 illustrates another example system architecture 1100 that can facilitate analog domain loopback modes, in accordance with an embodiment of this disclosure. In some examples, part(s) of system architecture 1000 can be used to implement system architecture 100 of FIGS. 1A, 1B, 1C, and 1D.

System architecture 1100 comprises loopback component that is configured to transmit an analog signal from a transmitter of a radio to a receiver of the radio via an analog loopback of the radio 1102; selector component that is configured to access the loopback component, wherein the selector component is positioned between the transmitter and a power amplifier of the radio 1104; and capture component that is configured to capture the analog signal received at the receiver 1106.

Loopback component that is configured to transmit an analog signal from a transmitter of a radio to a receiver of the radio via an analog loopback of the radio 1102 can be similar to hardware loopback that communicatively couples the transmitter and the receiver via an analog section of the radio unit, wherein the hardware loopback is selected at a component disposed between the transmitter and the power amplifier 604 of FIG. 6. Selector component that is configured to access the loopback component, wherein the selector component is positioned between the transmitter and a power amplifier of the radio 1104 can be similar to a portion of hardware loopback that communicatively couples the transmitter and the receiver via an analog section of the radio unit, wherein the hardware loopback is selected at a component disposed between the transmitter and the power amplifier 604 that is configured to select the hardware loopback. Capture component that is configured to capture the analog signal received at the receiver 1106 can capture and store this analog signal for later use, such as analysis of corresponding radio performance.

Example Process Flows

Figure 12:
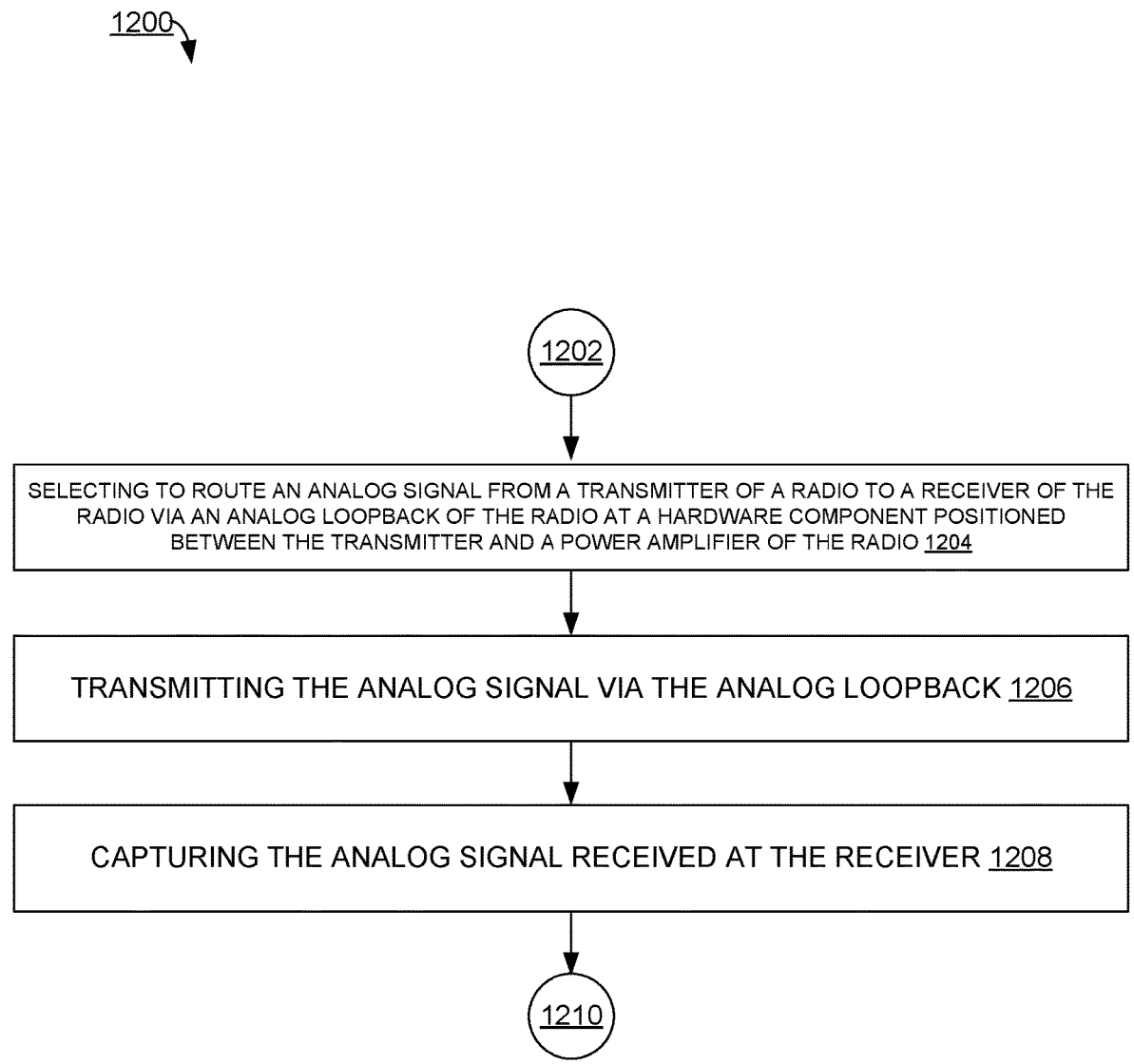
FIG. 12 illustrates an example process flow that can facilitate analog domain loopback modes, in accordance with an embodiment of this disclosure.

FIG. 12 illustrates an example process flow 1200 that can facilitate analog domain loopback modes, in accordance with an embodiment of this disclosure. In some examples, one or more embodiments of process flow 1200 can be implemented by system architecture 100 of FIGS. 1A, 1B, 1C, and 1D.

It can be appreciated that the operating procedures of process flow 1200 are example operating procedures, and that there can be embodiments that implement more or fewer operating procedures than are depicted, or that implement the depicted operating procedures in a different order than as depicted. In some examples, process flow 1200 can be implemented in conjunction with one or more embodiments of process flow 1300 of FIG. 13, process flow 1400 of FIG. 14, process flow 1500 of FIG. 15, and/or process flow 1600 of FIG. 16.

Process flow 1200 begins with 1202, and moves to operation 1204. Operation 1204 depicts selecting to route an analog signal from a transmitter of a radio to a receiver of the radio via an analog loopback of the radio at a hardware component positioned between the transmitter and a power amplifier of the radio. This can be performed, for example, by select 204 of FIG. 2, select 304 of FIG. 3, select 404 of FIG. 4, and/or select 504 of FIG. 5.

After operation 1204, process flow 1200 moves to operation 1206.

Operation 1206 depicts transmitting the analog signal via the analog loopback. This can be performed, for example, by TRx chip 202 of FIG. 2, TRx chip 302 of FIG. 3, TRx chip 402 of FIG. 4, and/or TRx chip 502 of FIG. 5.

After operation 1206, process flow 1200 moves to operation 1208.

Operation 1208 comprises capturing the analog signal received at the receiver. This can be performed, for example, by capture component that is configured to capture the analog signal received at the receiver 1106 of FIG. 11.

After operation 1208, process flow 1200 moves to 1210, where process flow 1200 ends.

Figure 13:
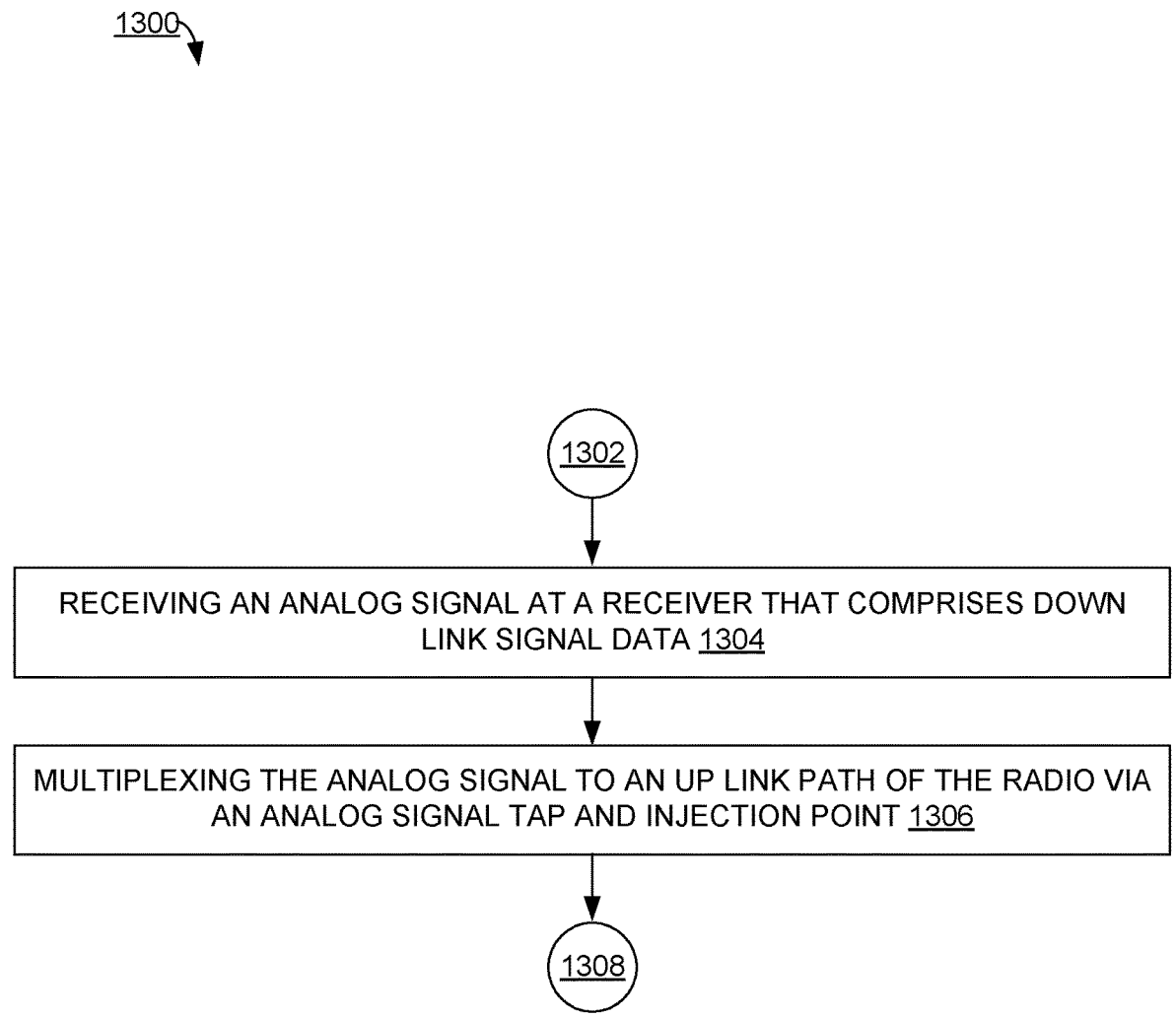
FIG. 13 illustrates another example process flow that can facilitate analog domain loopback modes, in accordance with an embodiment of this disclosure.

FIG. 13 illustrates another example process flow 1300 that can facilitate analog domain loopback modes, in accordance with an embodiment of this disclosure. In some examples, one or more embodiments of process flow 1300 can be implemented by system architecture 100 of FIGS. 1A, 1B, 1C, and 1D.

It can be appreciated that the operating procedures of process flow 1300 are example operating procedures, and that there can be embodiments that implement more or fewer operating procedures than are depicted, or that implement the depicted operating procedures in a different order than as depicted. In some examples, process flow 1300 can be implemented in conjunction with one or more embodiments of process flow 1200 of FIG. 12, process flow 1400 of FIG. 14, process flow 1500 of FIG. 15, and/or process flow 1600 of FIG. 16.

Process flow 1300 begins with 1302, and moves to operation 1304. Operation 1304 depicts receiving an analog signal at a receiver that comprises down link signal data. This receiver can be a receiver of TRx chip 202 of FIG. 2, TRx chip 302 of FIG. 3, TRx chip 402 of FIG. 4, and/or TRx chip 502 of FIG. 5.

After operation 1304, process flow 1300 moves to operation 1306.

Operation 1306 depicts multiplexing the analog signal to an up link path of the radio via an analog signal tap and injection point. That is, down link signal data that is received on an analog loopback can be multiplexed to an up link path.

After operation 1306, process flow 1300 moves to 1308, where process flow 1300 ends.

Figure 14:
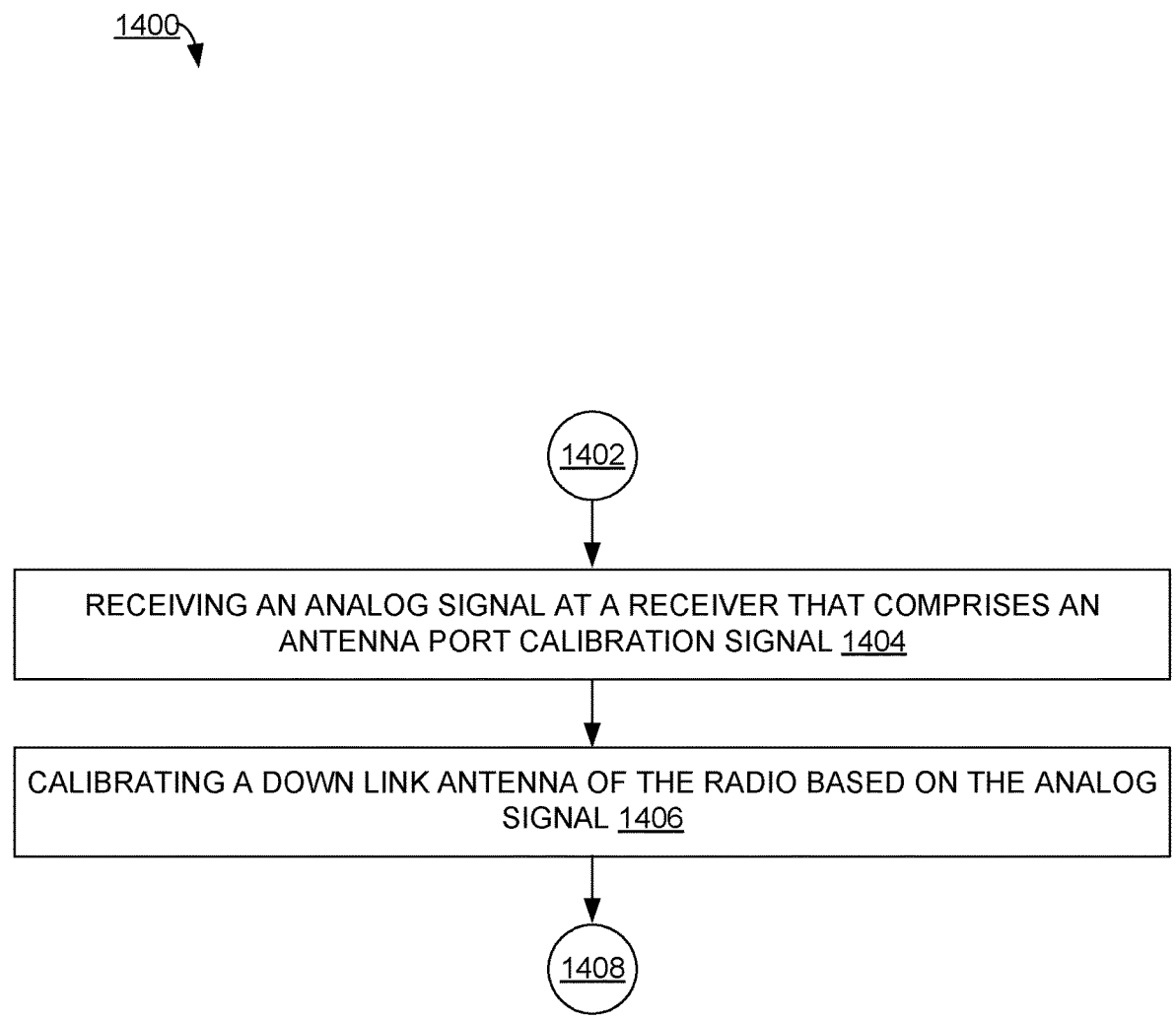
FIG. 14 illustrates another example process flow that can facilitate analog domain loopback modes, in accordance with an embodiment of this disclosure.

FIG. 14 illustrates another example process flow 1400 that can facilitate analog domain loopback modes, in accordance with an embodiment of this disclosure. In some examples, one or more embodiments of process flow 1400 can be implemented by system architecture 100 of FIGS. 1A, 1B, 1C, and 1D.

It can be appreciated that the operating procedures of process flow 1400 are example operating procedures, and that there can be embodiments that implement more or fewer operating procedures than are depicted, or that implement the depicted operating procedures in a different order than as depicted. In some examples, process flow 1400 can be implemented in conjunction with one or more embodiments of process flow 1200 of FIG. 12, process flow 1300 of FIG. 13, process flow 1500 of FIG. 15, and/or process flow 1600 of FIG. 16.

Process flow 1400 begins with 1402, and moves to operation 1404. Operation 1404 depicts receiving an analog signal at a receiver that comprises an antenna port calibration signal. This receiver can be a receiver of TRx chip 202 of FIG. 2, TRx chip 302 of FIG. 3, TRx chip 402 of FIG. 4, and/or TRx chip 502 of FIG. 5. The antenna port calibration signal can be from ant-cal port 220 of FIG. 2; ant-cal port 320 of FIG. 3; ant-cal port 420 of FIG. 4; and/or ant-cal port 520 of FIG. 5.

After operation 1404, process flow 1400 moves to operation 1406.

Operation 1406 depicts calibrating a down link antenna of the radio based on the analog signal. That is, a calibration of a down link antenna can be performed using a signal that is received in operation 1404 via an analog loopback.

After operation 1406, process flow 1400 moves to 1408, where process flow 1400 ends.

Figure 15:
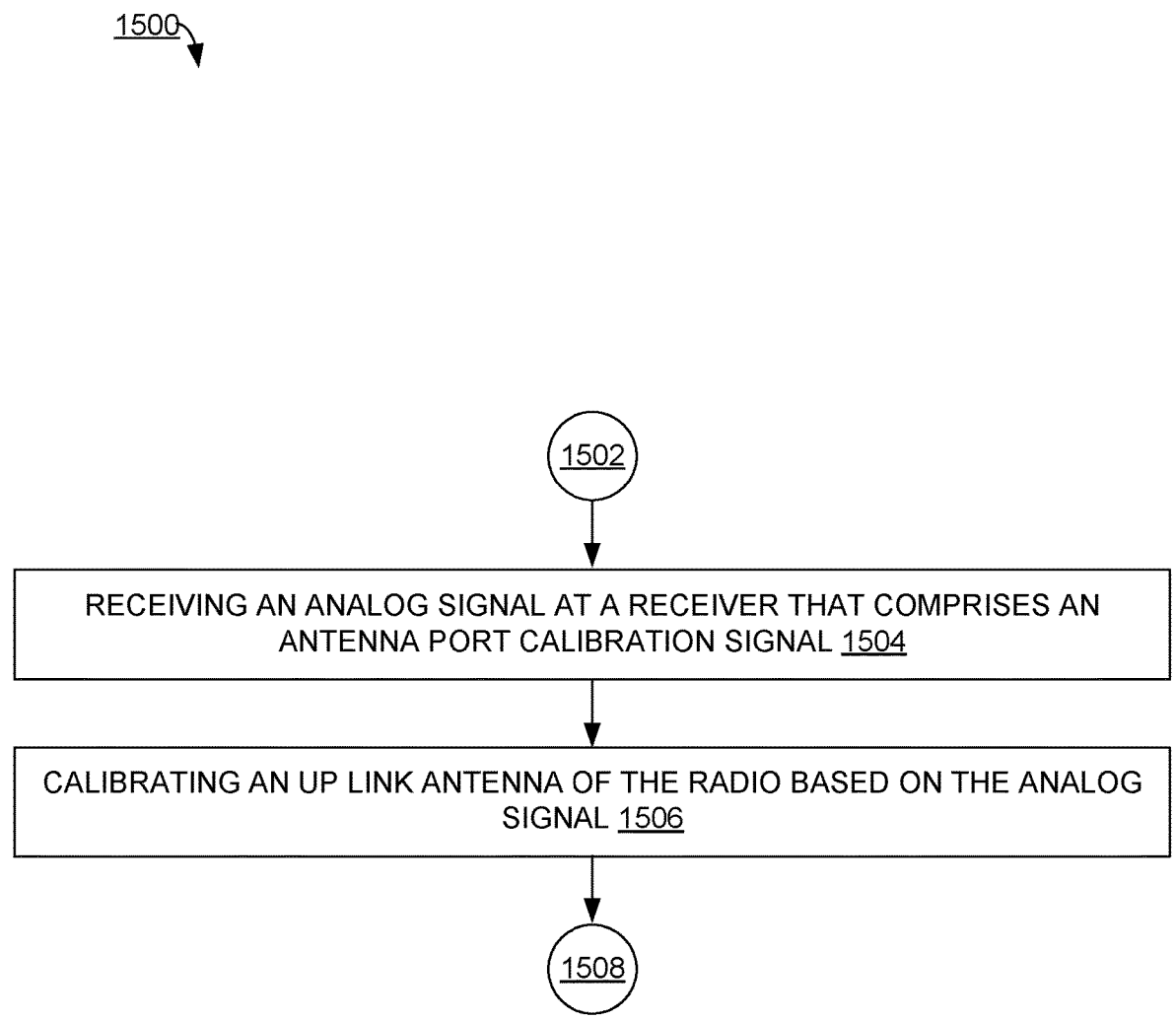
FIG. 15 illustrates another example process flow that can facilitate analog domain loopback modes, in accordance with an embodiment of this disclosure.

FIG. 15 illustrates another example process flow 1500 that can facilitate analog domain loopback modes, in accordance with an embodiment of this disclosure. In some examples, one or more embodiments of process flow 1500 can be implemented by system architecture 100 of FIGS. 1A, 1B, 1C, and 1D.

It can be appreciated that the operating procedures of process flow 1500 are example operating procedures, and that there can be embodiments that implement more or fewer operating procedures than are depicted, or that implement the depicted operating procedures in a different order than as depicted. In some examples, process flow 1500 can be implemented in conjunction with one or more embodiments of process flow 1200 of FIG. 12, process flow 1300 of FIG. 13, process flow 1400 of FIG. 14, and/or process flow 1600 of FIG. 16.

Process flow 1500 begins with 1502, and moves to operation 1504. Operation 1504 depicts receiving an analog signal at a receiver that comprises an antenna port calibration signal. This receiver can be a receiver of TRx chip 202 of FIG. 2, TRx chip 302 of FIG. 3, TRx chip 402 of FIG. 4, and/or TRx chip 502 of FIG. 5. The antenna port calibration signal can be from ant-cal port 220 of FIG. 2; ant-cal port 320 of FIG. 3; ant-cal port 420 of FIG. 4; and/or ant-cal port 520 of FIG. 5

After operation 1504, process flow 1500 moves to operation 1506.

Operation 1506 depicts calibrating an up link antenna of the radio based on the analog signal. That is, a calibration of an up link antenna can be performed using a signal that is received in operation 1504 via an analog loopback.

After operation 1506, process flow 1500 moves to 1508, where process flow 1500 ends.

Figure 16:
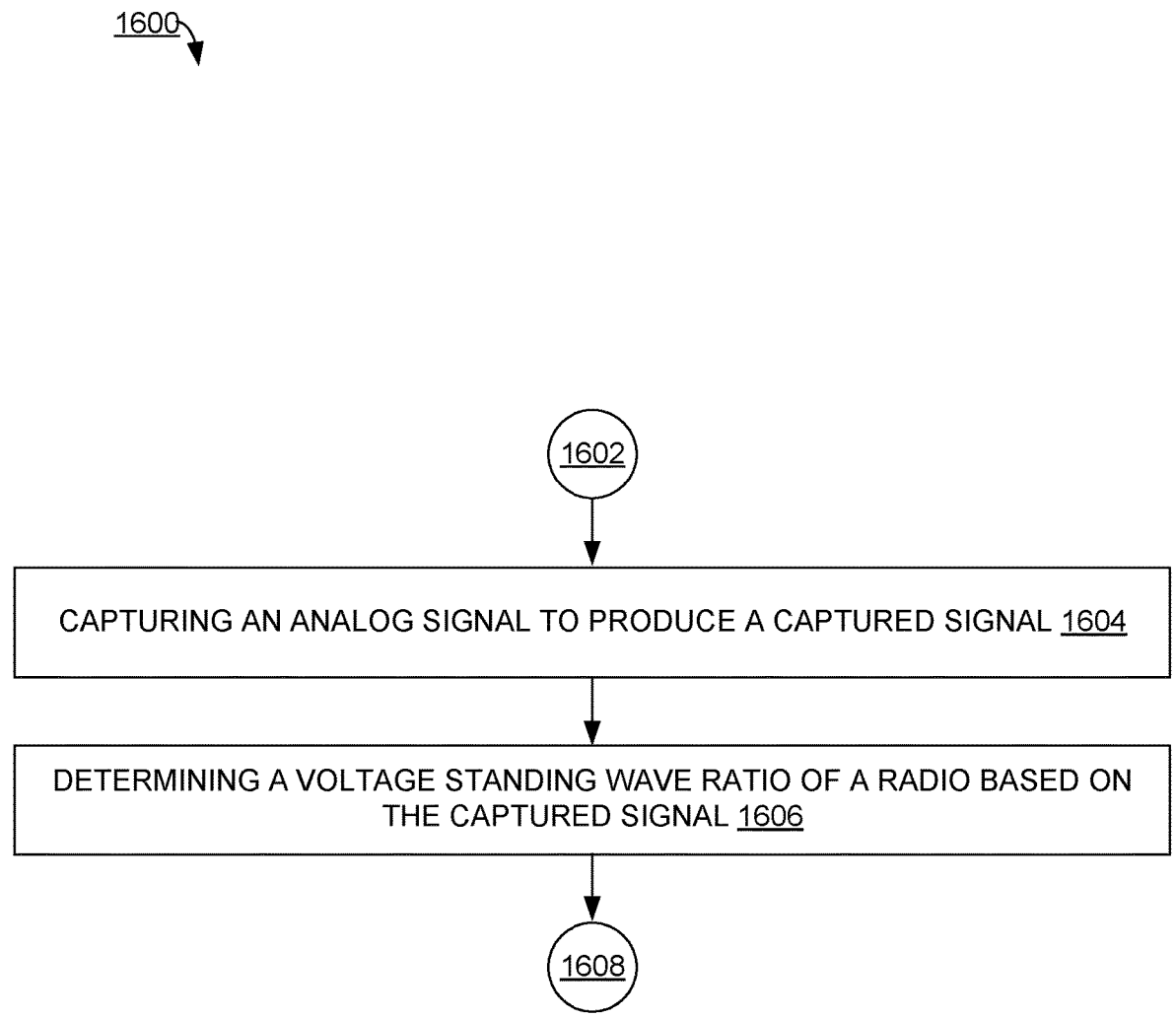
FIG. 16 illustrates another example process flow that can facilitate analog domain loopback modes, in accordance with an embodiment of this disclosure.

FIG. 16 illustrates another example process flow 1600 that can facilitate analog domain loopback modes, in accordance with an embodiment of this disclosure. In some examples, one or more embodiments of process flow 1600 can be implemented by system architecture 100 of FIGS. 1A, 1B, 1C, and 1D.

It can be appreciated that the operating procedures of process flow 1600 are example operating procedures, and that there can be embodiments that implement more or fewer operating procedures than are depicted, or that implement the depicted operating procedures in a different order than as depicted. In some examples, process flow 1600 can be implemented in conjunction with one or more embodiments of process flow 1200 of FIG. 12, process flow 1300 of FIG. 13, process flow 1400 of FIG. 14, and/or process flow 1500 of FIG. 15.

Process flow 1600 begins with 1602, and moves to operation 1604. Operation 1604 depicts capturing an analog signal to produce a captured signal. This can be performed, for example, by capture component that is configured to capture the analog signal received at the receiver 1106 of FIG. 11. This can be performed using an analog loopback similar to that of system architecture 300 of FIG. 3, which generally depicts a VSWR loopback path.

After operation 1604, process flow 1600 moves to operation 1606.

Operation 1606 depicts determining a voltage standing wave ratio of a radio based on the captured signal. That is, a determination regarding impedance matching of loads to a characteristic impedance of a transmission line can be determined based on the captured analog signal in operation 1604.

After operation 1606, process flow 1600 moves to 1608, where process flow 1600 ends.

Example Architecture

Figure 17:
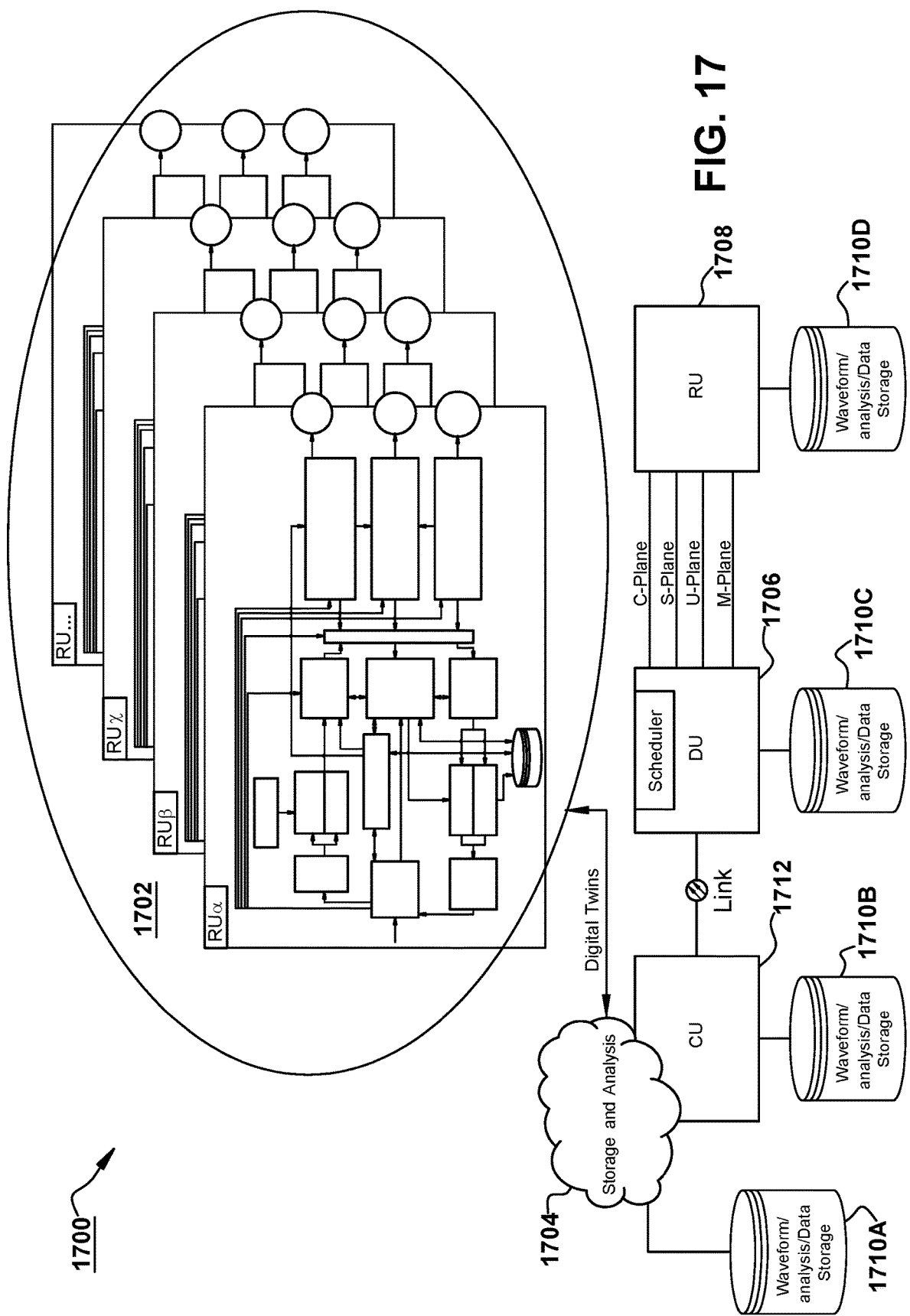
FIG. 17 illustrates an example system architecture for using analog domain loopback modes for a digital twin and/or predictive modeling, in accordance with an embodiment of this disclosure.

FIG. 17 illustrates an example system architecture 1700 for using analog domain loopback modes for a digital twin and/or predictive modeling, in accordance with an embodiment of this disclosure.

In some examples, system architecture 1700 can utilize signals generated as part of an analog loopback in system architecture 200 of FIG. 2, system architecture 300 of FIG. 3, system architecture 400 of FIG. 4, and/or system architecture 500 of FIG. 5 to produce a digital twin of a corresponding radio system and/or perform predictive modeling of the radio system.

System architecture 1700 comprises models 1702, storage and analysis 1704, distributed unit 1706, radio unit 1708, waveform/analysis/data storage 1710A, waveform/analysis/data storage 1710B, waveform/analysis/data storage 1710C, waveform/analysis/data storage 1710D, and central unit (CU) 1712.

Tap points disposed in radio unit 1708 and/or distributed unit 1706 can be used to capture signals. This information can be transmitted to central unit 1710 for storage and analysis 1704. Storage and analysis 1704 can produce models 1702. Models 1702 can be digital twins of radio systems, including a radio system comprising distributed unit 1706 and radio unit 1708. Models 1702 can also be other forms of modeling of a radio system to be used in predictive modeling of how the radio system will behave in the future (e.g., how it will perform, or whether it will need repair).

A digital twin can generally comprise a computer model of a radio system (rather than an actual physical radio system), and can be used to estimate how the corresponding physical radio system will behave.

Captured signals can also be stored and/or analyzed in various locations at waveform/analysis/data storage 1710A, waveform/analysis/data storage 1710B, waveform/analysis/data storage 1710C, and/or waveform/analysis/data storage 1710D.

Conclusion

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a radio unit comprising a transmitter, a receiver, and a power amplifier;
   a hardware loopback that communicatively couples the transmitter and the receiver via an analog section of the radio unit, wherein the hardware loopback is selected at a component disposed between the transmitter and the power amplifier; and
   a hardware component that is configured to transmit a first signal from the transmitter to the receiver via the hardware loopback, and to inject a second signal into a signal chain of the radio unit, wherein the first signal is received at the transmitter before transmitting the first signal to the receiver, wherein the second signal comprises a custom signal that is generated by the system, wherein the signal chain is configured to transmit signals from the transmitter to the receiver, wherein the first signal comprises mission mode data, wherein the second signal comprises custom data, and wherein the hardware component is configured to multiplex the first signal and the second signal.

2. The system of claim 1, wherein the hardware component is a first hardware component, and further comprising:
   a second hardware component that is configured to capture frequency domain data from a digital front end block of the radio unit, wherein the frequency domain data is based on the signal.

3. The system of claim 1, wherein the hardware component is a first hardware component, and further comprising:
   a second hardware component that is configured to capture time domain data from a digital front end block of the radio unit, wherein the time domain data is based on the signal.

4. The system of claim 1, wherein the hardware component is a first hardware component, and further comprising:
   a second hardware component that is configured to compare the signal received at the receiver via the hardware loopback with historical performance data.

5. The system of claim 4, wherein comparing the signal with the historical performance data produces compared data, and wherein the second hardware component is configured to analyze the compared data to determine a health of the radio unit, an aging of the radio unit, a soft fail of the radio unit, a no fault found of the radio unit, or a diagnostic data of the radio unit.

6. The system of claim 1, wherein the hardware component is a first hardware component, and further comprising:
a second hardware component that is configured to capture the signal received at the receiver via the hardware loopback to produce a captured signal, and analyze the captured signal to determine a performance metric.

7. The system of claim 6, wherein the second hardware component is configured to store the performance metric in a database that is local to the radio unit.

8. The system of claim 1, wherein the custom signal is generated at a radio unit of the system, at a distributed unit of the system, or at a central unit of the system.

9. A method, comprising:
selecting, by a system comprising a processor, to route an analog signal from a transmitter of a radio to a receiver of the radio via an analog loopback of the radio at a hardware component positioned between the transmitter and a power amplifier of the radio;
transmitting, by the system, the analog signal via the analog loopback;
injecting, by the system, a second signal into the analog loopback, wherein the second signal comprises a custom signal that is generated by the system, wherein the analog loopback is configured to transmit signals from the transmitter to the receiver, wherein the first signal comprises mission mode data, wherein the second signal comprises custom data, and wherein the system is configured to multiplex the first signal and the second signal; and
capturing, by the system, the analog signal and the second signal received at the receiver.

10. The method of claim 9, wherein the analog signal received at the receiver comprises down link signal data, and further comprising:
multiplexing, by the system, the analog signal to an up link path of the radio via an analog signal tap and injection point.

11. The method of claim 9, wherein the analog signal received at the receiver comprises an antenna calibration port signal, and further comprising:
calibrating, by the system, a down link antenna of the radio based on the analog signal.

12. The method of claim 9, wherein the analog signal received at the receiver comprises an antenna calibration port signal, and further comprising:
calibrating, by the system, an up link antenna of the radio based on the analog signal.

13. The method of claim 9, wherein capturing the analog signal produces a captured signal, and further comprising:
determining, by the system, a voltage standing wave ratio of the radio based on the captured signal.

14. The method of claim 9, wherein the custom signal is generated at a radio unit of the system, at a distributed unit of the system, or at a central unit of the system.

15. An apparatus, comprising:
a loopback component that is configured to transmit an analog signal from a transmitter of a radio to a receiver of the radio via an analog loopback of the radio, wherein the loopback component is configured to receive a custom signal that is generated by the apparatus and transmit the custom signal to the receiver;
a selector component that is configured to access the loopback component, wherein the selector component is positioned between the transmitter and a power amplifier of the radio; and
a capture component that is configured to capture the analog signal and the custom signal received at the receiver, wherein the analog signal comprises mission mode data, wherein the custom signal comprises custom data, and wherein the apparatus is configured to multiplex the analog signal and the custom signal.

16. The apparatus of claim 15, wherein the analog signal is originated from a radio unit of the radio or a distributed unit of the radio.

17. The apparatus of claim 15, wherein the analog signal is originated from a hybrid of a radio unit of the radio and a distributed unit of the radio.

18. The apparatus of claim 15, wherein the capture component is configured to capture the analog signal to produce a captured signal, wherein the capture component is part of a radio unit of the radio or a distributed unit of the radio, and wherein the capture component is configured to analyze the captured signal.

19. The apparatus of claim 15, wherein the capture component is configured to capture the analog signal to produce a captured signal, wherein the capture component is part of a hybrid of a radio unit of the radio and a distributed unit of the radio, and wherein the capture component is configured to analyze the captured signal.

20. The apparatus of claim 15, wherein the capture component is configured to capture the analog signal to produce a captured signal, wherein the capture component is part of a central unit of the radio, and wherein the capture component is configured to analyze the captured signal.

* * * * *